(12) United States Patent
Matsumoto et al.

(10) Patent No.: US 6,649,894 B2
(45) Date of Patent: Nov. 18, 2003

(54) OPTICAL NEAR FIELD GENERATOR

(75) Inventors: Takuya Matsumoto, Hachioji (JP);
Masashi Kiguchi, Kawagoe (JP);
Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/150,937

(22) Filed: May 21, 2002

(65) Prior Publication Data

US 2003/0066944 A1 Apr. 10, 2003

(30) Foreign Application Priority Data

Oct. 4, 2001 (JP) ........................................ 2001-308153

(51) Int. Cl.$^7$ ................................................ G02B 7/04

(52) U.S. Cl. .................................... 250/201.3; 250/306

(58) Field of Search .......................... 250/201.3, 201.5, 250/306, 307, 216, 239; 359/636, 639

(56) References Cited

U.S. PATENT DOCUMENTS 5,254,854 A * 10/1993 Betzig ........................ 250/234

OTHER PUBLICATIONS

T. Saiki, S. Mononobe and M. Ohtsu, N, Saito and J. Kusano, "Tailoring a High–Transmission Fiber Probe for Photon Scanning Tunneling Microscope", Appl. Phys. Lett. 68 (19), May 6, 1996, pp. 2612–2614.

Takuya Matsumoto, Takeshi Shimano and Sumio Hosaka, "An Efficient Probe with a Planar Metallic Pattern for High–Density Near–Field Optical Memory", 6$^{th}$ International Conference on Near Field Optics and Related Techniques, Aug. 27–31, 2000, p. 55.

M. Ohtsu, "Near–Field Nano/Atom Optics and Technology", (1998) pp. 208–209 Month Unknown.

Justin B. Judkins and Richard W. Ziolkowski, "Finite–difference time–domain modeling of Nonperfectly Conducting Metallic Thin–film Gratings", J. Oppt. Soc. Am, A/vol. 12, No. 9/Sep. 1995, pp. 1974–1983.

* cited by examiner

Primary Examiner—Que T. Le

(57) ABSTRACT

An optical near field probe of high resolution and high efficiency is disclosed. A near field light is generated using a tapered, plane scatterer formed on a substrate surface. The intensity of the near field light is enhanced by making the area of the scatterer smaller than that of a light spot and by selecting the material, shape, and size of the scatterer so as to generate plasmon resonance. An optical near field generator having a high light utilization efficiency can be obtained.

20 Claims, 27 Drawing Sheets

FIG. 26(a) FORMING A PATTERN ON A SACRIFICIAL SUBSTRATE
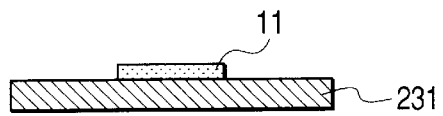
FIG. 26(b) FORMING A TRANSPARENT LAYER
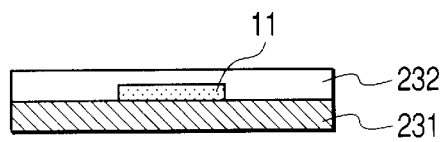
FIG. 26(c) COATING RESIST
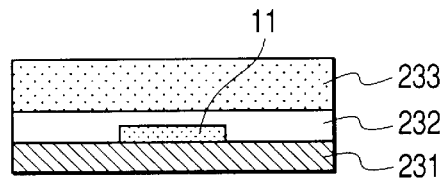
FIG. 26(d) EXPOSURE
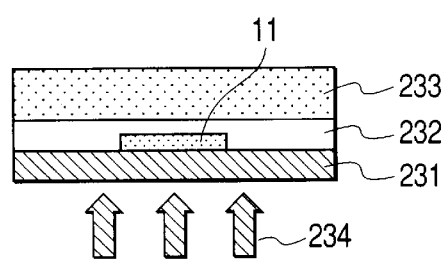
FIG. 26(e) DEVELOPMENT
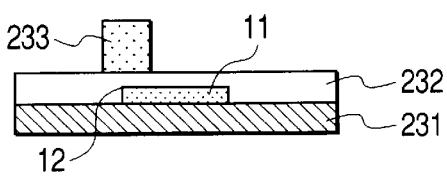
FIG. 26(f) FORMING AN OPAQUE LAYER
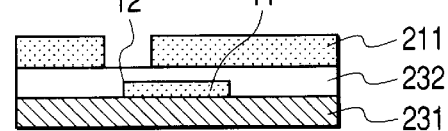
FIG. 26(g) ATTACHING A TRANSPARENT SUBSTRATE
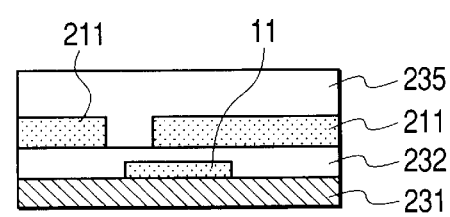
FIG. 26(h) REMOVING THE SACRIFICIAL SUBSTRATE
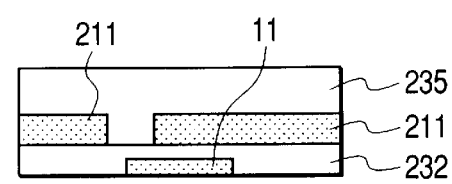

OPTICAL NEAR FIELD GENERATOR

This application claims priority to Japanese Patent Application No. 2001-308153 filed on Oct. 4, 2001.

BACKGROUND OF THE INVENTION

1. Field of the Invention

The present invention relates to an optical near field generator for generating a near field light and methods for generating near field light.

2. Description of the Background

In a conventional optical microscope, light is condensed using a lens. Therefore, resolution is limited by the wavelength of the light. Alternatively, in a near-field optical microscope, light is condensed using a microstructure having a size on the order of nanometers, e.g., an aperture having a diameter of not larger than the wavelength of light, instead of lens. When light is applied to such a microstructure, a localized light called "near field light" is generated near the microstructure. By approximating this near field light to a sample and allowing it to scan an upper surface of the sample, it is possible to measure the shape and optical characteristics of the sample with a resolution which is determined by the size of the microstructure. Recently, microscopes of this type have been applied to various fields, including measuring the shape and spectroanalysis of biosamples, semiconductor quantum structures, and polymers, as well as in high-density optical recording. "Near field light" as referred to herein means a localized light, i.e., light that has a wave number (k) with an imaginary component.

A widely used optical near field generator (hereinafter referred to as "near field optical probe" is a tapered optical fiber (optical fiber probe) having an aperture with a diameter that is not larger than the wavelength of light. The optical fiber probe is fabricated by stretching one end of an optical fiber under heating or tapering it by chemical etching and subsequently coating the optical fiber with metal except at the tip portion of the optical fiber. By introducing light into the optical fiber it is possible to generate a near field light in the vicinity of the aperture formed in the tip of the optical fiber.

However, the above fiber probe is disadvantageous in that the light utilization efficiency is low. For example, when the aperture diameter is 80 nm, the ratio between the intensity of light incident on the optical fiber and that of light output from the fiber tip is $10^5$ or less (See, Applied Physics Letters, Vol. 68, No. 19, pp. 2612–2614, 1996).

In view of this, there has been proposed a probe using a plane metal scatterer. This probe, shown in FIG. 34, includes a plane metal scatterer 341 having a triangular shape formed on a plane substrate. In FIG. 34(a) a probe is shown having one metal scatterer 341, and in FIG. 34(b) a probe is shown having two metal scatterers 341. Upon incidence of X-polarized light, a near field light is localized at a vertex 342. Particularly, by making the wavelength of incident light match the plasmon resonance it is possible to generate a very powerful near field light (See, Technical Digest of $6^{th}$ international conference on near field optics and related techniques, the Netherlands, Aug. 27–31, 2000, p55). In FIG. 34(a), a near field light is generated from the vertex 342 of the metal scatterer 341, and in FIG. 34(b), the two metal scatterers 341 are disposed such that a vertex-to-vertex spacing is several tens of nanometers or less, with a localized near field light being generated in the vertex-to-vertex spacing 343 (the gap).

The above probes using triangular plane scatterers may attain a higher near field light generation efficiency compared to other methods, especially if the frequency of light and the resonance frequency of plasmon generated in the metal are made coincident with each other. In this conventional example, however, the size and shape of the scatterer are not optimized.

SUMMARY OF THE INVENTION

The present invention preferably provides improved shape and size characteristics for a plane scatterer for the efficient generation of plasmon in a probe using the scatterer. A near field optical probe of high resolution and high efficiency may therefore be achieved.

In at least one presently preferred embodiment, a near field light is generated by an electrically conductive scatterer which is tapered toward a near field light generating vertex, and the area of the scatterer is adjusted so as to be smaller than the area of a light spot radiated to the scatterer (herein, the "light spot" is a cross-section of the light taken in the plane that is parallel to and at the surface of the scatterer) or smaller than the square of the wavelength of light radiated to the scatterer. Additionally, the distance between the near field light generating vertex of the scatterer and a point which is most remote (i.e., furthest) from said vertex is smaller than the diameter of a light spot radiated to the scatterer or smaller than the wavelength of the radiated light. With this constraint, the phase of the light radiated into the scatterer becomes uniform at various points, and it is thus possible to efficiently excite plasmon resonance.

It is preferable that the area of the light spot radiated to the scatterer be set at a value of not more than one hundred times the area of the scatterer (or, if expressed in terms of length, the light spot diameter on the scatterer be not more than ten times the distance between the near field light generating vertex of the scatterer and a point furthest from the vertex). As a result, it is possible to decrease the amount of light passing without impinging on the scatterer and to improve the light utilization efficiency.

To maximize the energy of light introduced into the scatterer, it is preferable that a central position of light incident on the scatterer be aligned with a central position of the scatterer. Alternatively, in order to maximize a single portion of the near field light, the central position of incident light may be made substantially coincident with the position of the near field light generating vertex. The "substantial coincidence" means that the distance between the central position of the incident light and the vertex is no more than half of the full width at half maximum of the incident light spot. The "vertex" as referred to herein indicates not only an actually intersecting point of a first line (side) and a second line (side) but also a point having a predetermined curvature.

In application, the surface of the scatterer and that of a recording medium are preferably set so as to be substantially in parallel with each other. This "substantially parallel" limitation means that the angle between the surface of the scatterer and that of the recording medium be within 5°. By satisfying this condition, it becomes possible for light to be incident in a direction perpendicular to the surface of a sample or recording medium and hence possible to use an optical system which is employed in a conventional microscope or recording/reproducing apparatus.

The aforesaid angle between the surface of the scatterer and that of a sample or recording medium may also be set at a value in the range of 0° to 90°. In this case, the scatterer is disposed in such a manner that the distance from the near field light generating vertex to the sample or the medium is shorter than the distance from another portion of the scatterer to the sample or the medium. With this arrangement, it is possible to diminish the influence of a near field light generated at an edge portion which lies on the side opposite to the near field light generating vertex.

The above-described scatterer may be formed as a film having, for example, three or more vertices. In this case, for preventing a near field light from being generated at a vertex other than the near field light generating vertex, the radius of curvature of this other vertex is set larger than that of the near field light generating vertex. The scatterer may be in a combined shape of a tapered film and a circular film or in a shape having a curvilinear portion, such as a sectorial shape. By making the radius of curvature of the curvilinear portion larger than that of the near field light generating vertex, it is possible to prevent a near field light from being generated at a portion other than the near field light generating vertex.

The angle of the near field light generating vertex may be changed stepwise. For example, in the aforesaid combined film of a tapered film and a circular film, if a vertical angle (Q in FIG. 4A) at the near field light generating tip is set small and the angle of a portion spaced apart from the tip is set large, the radius of curvature of the circular portion can be set large, and it is possible to decrease the intensity of a near field light generated in the circular portion. Conversely, if the vertical angle (Q) at the near field light generating tip is set large and the angle of the portion spaced apart from the tip is set small, it is possible to decrease the length at the edge portion located on the side opposite to the near field light generating vertex. As a result, it is possible to reduce the total area of the scatterer, and in the case of using many scatterers (as will be described later), it is possible to increase the number of scatterers in the arrangement.

When the angle between the surface of the scatterer and the surface of the sample or recording medium is larger than 0° and not larger than 90°, the angle of the near field light generating vertex may be set at 0°. This is for the following reason. When the angle of the near field light generating vertex is 0°, the radius of curvature on the side opposite to the near field light generating vertex becomes small to about the same degree as the near field light generating vertex, and a powerful near field light is generated there. However, there is no such influence if the side opposite to the near field light generating vertex is thus spaced apart from the sample or recording medium.

In the above scatterer, given that the distance between a first tangential line at the near field light generating vertex and a second tangential line on the opposite side parallel thereto is L, a real number part of the dielectric constant of the scatterer is e, the dielectric constant of the surrounding material is $e_m$, a coefficient dependent on the material of the scatterer is P, a coefficient dependent on the angle of the near field light generating vertex is A, and a coefficient dependent on the dielectric constant of a medium or sample is M, it is preferable that one of the following conditions be satisfied:

$$Px(-2.5\times(e/e_m+M+A)+30)<L<Px(-20\times(e/e_m+M+A)+50)$$

or $$Px(-70\times(e/e_m+M+A)-850)<L<Px(-90\times e/e_m+M+A)+50)$$

As a result, plasmon resonance can be excited, and it is possible to generate a powerful near field light. The coefficient dependent on the material of the scatterer is set at, for example, 0.5 in a case containing 70% or more of aluminum, 0.8 in a case containing 70% or more of magnesium, 1 in a case containing 70% or more of gold, 1 in a case containing 70% or more of copper, or 1 in a case containing 70% or more of silver. The coefficient M dependent on the dielectric constant of the medium or sample is set at 0 in the absence of any medium or sample, 0 in a case the medium or sample used being a dielectric, or 5 in a case the medium or sample used being a metal or a semiconductor. The coefficient A dependent on the "Q" angle and is set at A=-0.05×Q+3 where Q stands for the angle of the near field light generating vertex. For generating a powerful near field light, it is preferable that the angle Q of the near field light generating vertex be set at a value in the range of 30° to 80°.

Because the wavelength at which plasmon resonance occurs differs depending on the material, it is preferable that a suitable material be selected for the scatterer in conformity with the wavelength used. For example, if the length L is about 100 nm, it is preferable to use aluminum or magnesium at a wavelength of 300 to 500 nm, silver at a wavelength of 400 to 700 nm, and gold or copper at a wavelength of 500 to 800 nm. It is preferable to choose a material which does not easily undergo oxidation and is not difficult to process. As between silver and gold, gold is the more suitable because it does not undergo oxidation. As between aluminum and magnesium, aluminum is the more suitable because it is the easier to form into a film.

It is preferable that the thickness of the scatterer (in both singular and cases in which a plurality of scatteres are used) be made smaller toward the near field light generating vertex. By so doing, an electric charge gathers toward the near field light generating point, so that it is possible to enhance the near field light intensity.

There may be adopted a construction wherein in the vicinity of a filmy scatterer whose width is smaller toward the near field light generating vertex there is disposed a second scatterer having electric conductivity in such a manner that the closest spacing between the near field light generating vertex of the first scatterer and the second scatterer is not larger than the wavelength of light incident on the scatterers. According to this construction, electric charges present in the scatterers act on each other and a powerful near field light is generated between the scatterers. Particularly, if the second scatterer is also a filmy scatterer whose width is smaller toward the near field light generating vertex, it is possible to generate a very powerful near field light. For the same reason as in case of a single scatterer (above), the total area of the scatterers is preferably set at a value of not larger than the area of a light spot radiated to the scatterers or not larger than the square of the wavelength of light radiated to the scatterers. A longest width portion of the region where the plurality of scatterers are present is set at a value of not larger than the diameter of the light spot radiated to the scatterers or not larger than the wavelength of light radiated to the scatterers. Preferably, the area of the light spot is not larger than one hundred times the total area of the plurality of scatterers, or the diameter of the light spot radiated to the scatterers is not larger than ten times the longest width portion of the region where the plural scatterers are present.

Preferably, the scatterers are two scatterers of the same shape, and one scatterer is oriented in a 90° or 180° rotated direction of the other scatterer, centered on the near field light generating vertex.

Consideration will now be given to the case where a second scatterer (out of two tapered scatterers) is disposed in a 180° rotated direction of a first scatterer, centered on a near field light generating vertex. The material used for the first scatterer and that for the second scatterer are made equal to each other, and the distance L between a first tangential line at the near field light generating vertex and a second tangential line on an opposite side parallel thereto is made equal between both scatterers. In this case, given that a real number part of dielectric constant of each scatterer is e, the dielectric constant of the surrounding material is $e_m$, a coefficient P dependent on the material of each scatterer is P, a coefficient dependent on the angle of the near field light generating vertex is A, and a coefficient dependent on the dielectric constant of a medium or sample is M, it is preferable that one of the following conditions be satisfied:

$$Px(-2.5 \times (e/e_m+M+A)-20) < L < Px(-20) \times (e/e_m+M+A)$$

or $$Px(-70 \times (e/e_m+M+A)-900) < L < Px(-90) \times (e/e_m+M+A)$$

Once this condition is satisfied, it is possible to excite plasmon resonance and generate a powerful near field light. The coefficient P depends on the scatterer material, the coefficient M depends on the dielectric constant of a medium or sample, and the coefficient A depends on angle, and they are set in the same manner as in case of a single scatterer.

The number of scatterers formed in the vicinity of the first scatterer may be two or more. By arranging scatterers in different directions it is possible to increase the number of polarization directions allowable for generating a near field light. Further, by making the scatterers different in plasmon resonance frequency, it is possible to widen the range of wavelength allowable for generating a near field light.

In the case of combining two or more scatterers as mentioned above, it is preferable that a central position of light incident on the scatterers be made substantially coincident with a point at which the total of the distances up to near field light generating vertexes in the scatterers becomes smallest. The "substantial coincidence" means that the distance between the central position of the incident light and each of the vertices is within one half of full width at half maximum of the incident light spot.

If each scatterer is buried in a substrate surface such that a surface of the scatterer to be approximated to a sample or a recording medium and the substrate surface are substantially flush with each other, it is possible to decrease wear of the scatterer. The "substantially flush" means that a difference in height is within 50 nm. Alternatively, in the case where it is necessary to let the probe scan at high speed, such as in an optical write/read of information, a pad portion may be formed in the vicinity of the scatterer in such a manner that the surface of the scatterer for approach to a sample or a recording medium and the pad surface are substantially flush with each other. Also in this case, it is possible to diminish wear of the scatterer, and the "substantially flush" here again indicates that a difference in height is within 50 nm.

A light shielding, or opaque, film may be formed in the vicinity of each scatterer in such a manner that the spacing between the scatterer and the opaque film is smaller than the wavelength of light incident on the scatterer. By so doing, it is possible to prevent the occurrence of background light. For minimizing the occurrence of background light, there may be provided a bonded portion of both the opaque film and the scatterer. This film-scatterer bonding should be done at a portion other than the near field generating vertex and other than the electric charge gathering edge portion on the opposite side. The thickness of the opaque film may be increased for improving the light shielding property or the thickness of the scatterer may be increased for permitting easy access of the scatterer to a sample.

For preventing the occurrence of background light, a second layer having an opaque film may be formed in the vicinity of a first layer where the scatterer is formed. In this case, the first and second layers are spaced a distance not longer than the wavelength of light incident on the scatterer, and an aperture not larger than the wavelength of incident light on the scatterer is formed in the opaque film of the second layer so that the position of the aperture is substantially coincident with a near field light generating vertex of the scatterer. By detecting light which has passed through the aperture in the second layer, it is possible to check a decreased detection of background light.

The scatterer may be formed at a light condensing point on a light condensing element, whereby it becomes unnecessary to make a positional adjustment of the light condensing element and the scatterer. Also, the scatterer may be formed near an exit surface of an optical resonator, more specifically within 10 $\mu$m from the exit surface. By so doing, light which has been reflected without impinging on the scatterer is returned by the resonator and is again radiated to the scatterer, so that it may be possible to improve the light utilization efficiency.

The scatterer may also be disposed near an exit surface of a semiconductor laser, more specifically within 10 $\mu$m from the exit surface. With this arrangement, it becomes unnecessary to make a positional adjustment of a light source and the scatterer. Further, the scatterer may be formed near a light receiving surface of a photodetector, more specifically within 10 $\mu$m from the light receiving surface. This arrangement makes a positional adjustment of the photodetector and the scatterer unnecessary, and it may be possible to diminish the loss of energy generated between the probe and the detector.

The scatterer may be formed on a flat surface at the tip of the projecting portion of a cone or a pyramid. In this case, the area of a portion which approaches a sample or a recording medium decreases, such that it becomes easier to let the probe approach the sample or the recording medium. In this case, moreover, if the side face of the cone or the pyramid is covered with a metallic or light-shielding film and if the area, or a minimum value of width, of the flat surface on which the scatterer is formed is set at a value of not larger than the square of the wavelength of light traveling through the interior of the cone or the pyramid, light can be condensed by the projecting portion of the cone or the pyramid, with a consequent improvement of efficiency.

The scatterer may be formed on a side face of the projecting portion of a pyramid so that the position of a near field light generating vertex and that of the pyramid vertex are substantially coincident with each other. For example, a film which is tapered toward a vertex is formed on one or two opposed faces of a quadrangular pyramid. In this case, since the probe tip is sharp, the measurement of a sample having concave and convex surface portions becomes feasible. The "substantial coincidence" means that the distance between the near field light generating vertex and the pyramid vertex is within 50 nm.

The above probe using the scatterer can be utilized in a near field optical microscope. More particularly, the probe is placed in the vicinity of a sample (within several tens of nanometers in distance), and laser light is radiated to the scatterer. Scattered light and emitted light resulting from interaction between the near field light generated in the probe and the sample are condensed by an objective lens and are detected by a photodetector. By thus using the probe according to the present invention, it becomes possible to measure a sample with both high resolution and high efficiency. It is therefore possible to make a high resolution measurement of a spatial distribution of weak light signals such as emitted light and non-linear light.

The above probe using the scatterer is also applicable to a near field optical recording/reproducing apparatus. For performing a high-speed scan while keeping the spacing between the scatterer and a recording medium at a distance of not larger than several tens of nanometers, the scatterer is formed on a slider, and laser light is directed thereto. Upon incidence of light which is powerful enough to form a bit cell on the recording medium, a bit cell is formed on the medium. In reproduction, light is applied to the scatterer, allowing a near field light to be generated, and scattered light resulting from the interaction between the near field light and the scatterer is condensed by an objective lens and is detected by a photodetector. In this case, as the condenser lens, the objective lens which has been used for introducing light into the probe may be used, or an objective lens disposed on the opposite side with respect to the medium may be used. Thus, by executing recording and reproduction using a probe according to the present invention, it becomes possible to implement a recording/reproducing apparatus which satisfies both high recording density and high transfer speed.

The above probe using the scatterer is further applicable to an exposure system. More specifically, the probe according to the present invention is approximated to an upper surface of a resist formed on a substrate surface, and light is directed thereto, whereby the resist is exposed to a near field light generated by the probe. With the probe according to the present invention, the exposure of a pattern having a size of no more than several tens of nanometers can be done at a high speed.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 26 illustrates a probe fabrication method wherein a layer of an opaque film having an aperture is formed in the vicinity of a scatterer-placed layer, in which 26(*a*) shows a pattern forming step, 26(*b*) shows a light-permeable film forming step, 26(*c*) shows a resist film forming step, 26(*d*) shows an exposure step, 26(*e*) shows a development step, 26(*f*) shows an opaque film forming step, 26(*g*) shows a transparent substrate forming step, and 26(*h*) shows a sacrificial substrate removing step;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

First Exemplary Embodiment

Figure 1:
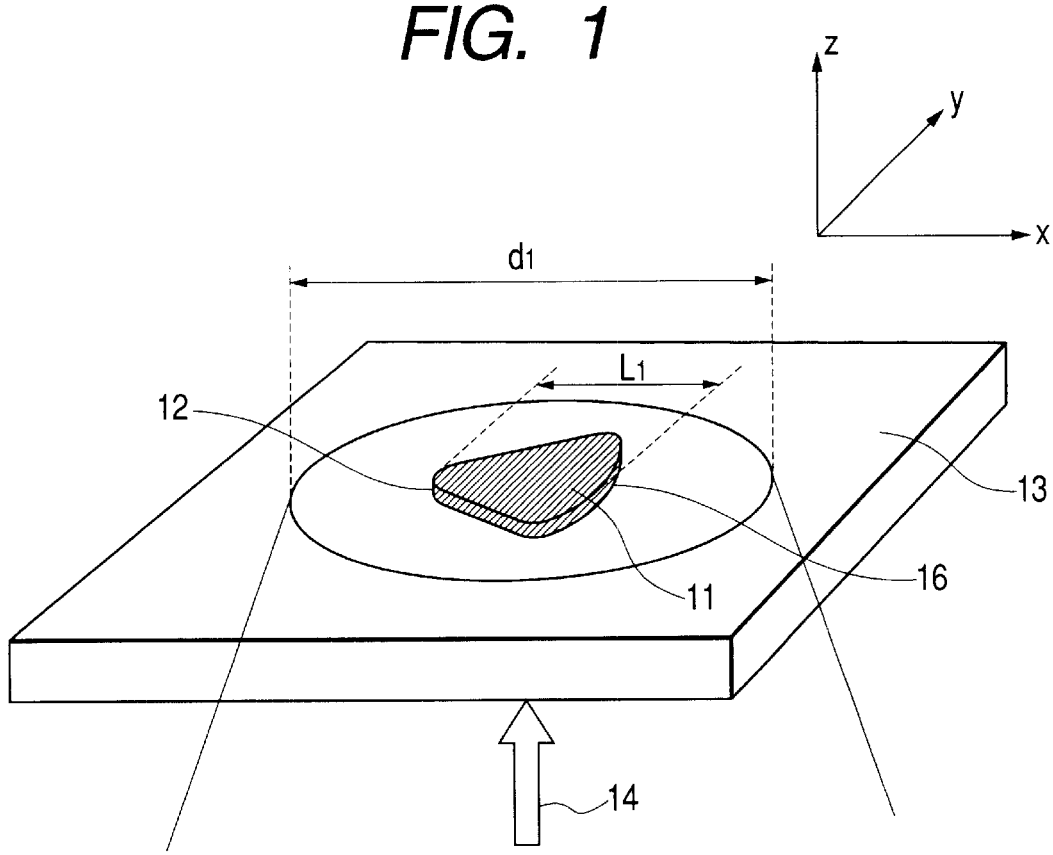
FIG. 1 is a sectional view showing the shape of an optical near field generator according to the present invention.

An optical near field generator according to the present invention will be described. As shown in FIG. 1, an optical near field generator according to the present invention is made up of a plane substrate 13 and an electrically conductive plane scatterer 11 which is tapered toward a vertex 12 thereof. The vertex 12 has a radius of curvature not larger than the wavelength of incident light. When light 14 from a light source is made incident so that a polarization direction thereof faces the x-direction in the figure, an electric charge present in the scatterer 11 oscillates in the same direction as the polarization direction and is concentrated on the vertex 12. As a result, a powerful near field light is generated in the vicinity of the vertex 12.

As the material of the electrically conductive scatterer, there is used a metal such as a semiconductor, e.g., Si or GaAs, gold, silver, copper, aluminum, or magnesium. The plane substrate on which the scatterer is formed is preferably a light-permeable substrate, which is here defined to be a substrate having a light transmittance of at least 70%. This is because light can also be made incident from the side opposite to the scatterer-formed side. For example, $SiO_2$, sapphire, or GaN may be used as the material of the scatterer forming substrate.

Figure 2:
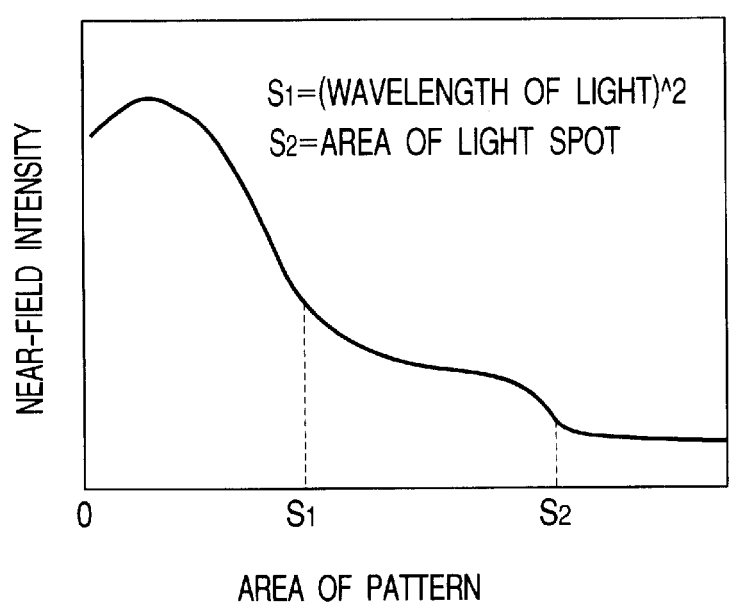
FIG. 2 illustrates a relationship between the area of a scatterer and near field intensity.

The size of the scatterer is set such that its area is smaller than the area (point $S_2$ in FIG. 2) of an incident light spot (in terms of length, the distance between the vertex 12 and a point most remote from the vertex is made smaller than the diameter $d_1$ of the light spot). As a result, an electric charge having polarity opposite to the electric charge concentrated on the vertex 12 gathers at an edge 16 on the side opposite to the vertex 12. Thereafter, the electric charges at the vertex 12 and the edge 16 interact so as to attract each other, generating an oscillation of the electric charges. When the frequency of incident light coincides with a resonance frequency (plasmon resonance frequency) of the electric charge oscillation, there occurs a very powerful near field light at the vertex 12.

If the area of the scatterer is set smaller than the square of the wavelength of incident light (point $S_1$ in FIG. 2) (in terms of length, the distance between the vertex 12 and a point most remote from the vertex is made shorter than the wavelength of incident light), it is possible to generate a more powerful near field light. This occurs because electrons oscillating within the scatterer become uniform in phase, and therefore electric charges are concentrated efficiently by the vertex 12.

If the light spot diameter is much larger than the area of the scatterer, a lowering of efficiency results. That is, light which has not impinged (made incident) on the scatterer makes no contribution to the generation of near field light, and therefore, the generation efficiency of near field light deteriorates. For example, in the case of application to an optical recording/reproducing apparatus, and further if the recording density is about 1 T/inch², a data transfer speed of about 1 Gbps is required and an efficiency of 1% or more is required (M. Ohtsu ed., *Near-field Nano/Atom Optics and Technology*, Springer-Verlag, Tokyo, 1998, p209). Assuming that all the energy of light impinged on the scatterer is converted to the energy of near field light, then to realize an efficiency of at lest 1%, it is necessary that the area of the light spot be not more than one hundred times the area of the scatterer. In terms of length, it is necessary that the spot diameter be not more than ten times the distance between the near field light generating vertex of the scatterer and the point most remote from the vertex. If there is a loss in the course of conversion of the light energy on the scatterer into the energy of near field light, it may be necessary to further decrease the spot diameter.

Preferably, the scatterer is in the shape of a film which is tapered toward a vertex, the vertex having a radius of curvature smaller than the wavelength of incident light. It is also preferable that the radius of curvature at the portion other than the near field light generating vertex be made larger than that of the near field light generating vertex. This occurs because, if there exists a point having a radius of curvature which is about the same as that of the near field light generating vertex, a near field light will be generated also on that point.

Figure 3A:
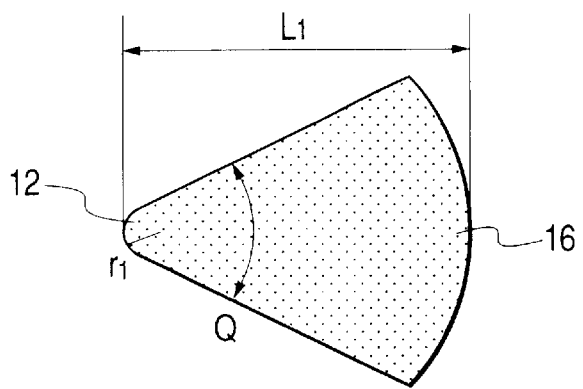
FIG. 3 illustrates scatterer shapes, in which 3(a) shows a sectorial shape, 3(b) shows a triangular shape, 3(c) shows a combination of a triangle and a circle, and 3(d) shows a shape having not less than four vertices.
Figure 3B:
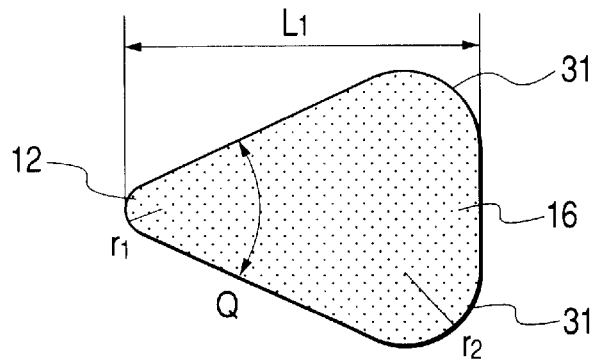
Figure 3C:
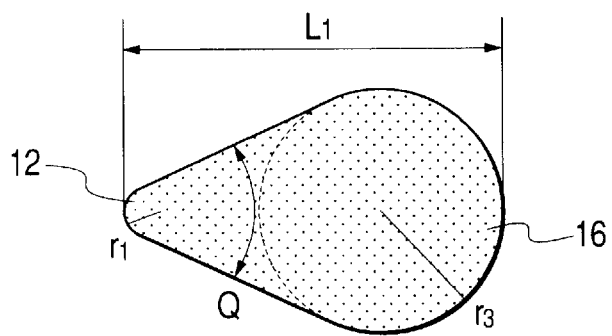
Figure 3D:
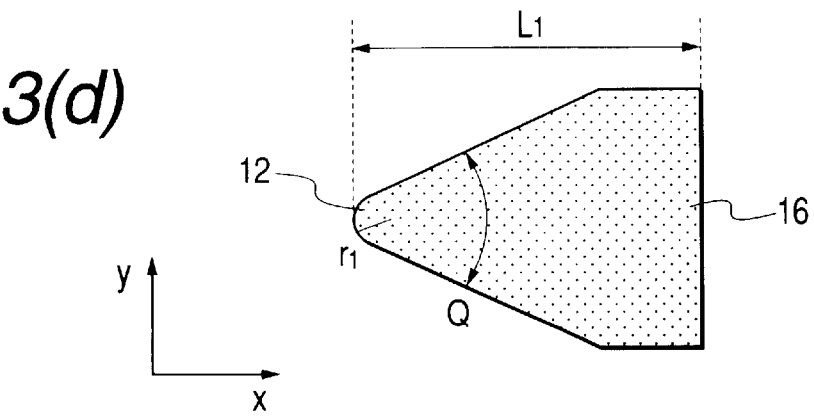

The shape of the scatterer is, for example: a sectorial shape as shown in FIG. 3(a); a triangular shape as shown in FIG. 3(b) (it is preferable that the radius of curvature $r_2$ of each vertex 31 be set larger than the radius of curvature $r_1$ of a vertex 12 in order to prevent the occurrence of a powerful near field light at the vertex 31); a combined shape of a triangle and a circular shape having a radius of curvature $r_3$ larger than the radius of curvature r1 of the vertex 12 as shown in FIG. 3(c); or a shape having four or more vertices as shown in FIG. 3(d). If x-polarized light is applied to these scatterers, a powerful near field light is generated at the vertex 12.

Figure 5A:
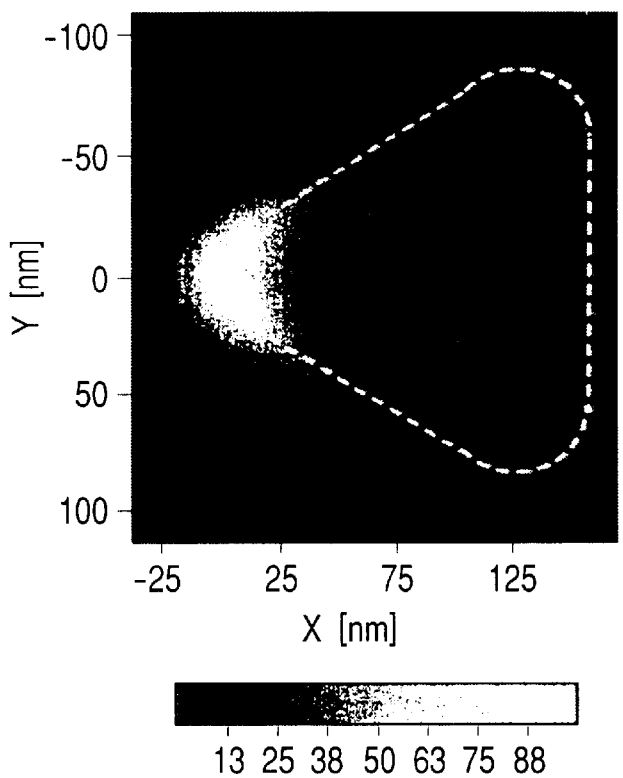
FIG. 5 illustrates near field intensity distributions in the vicinity of scatterers, in which 5(a) shows such a distribution in the case of a triangular scatterer and 5(b) shows such a distribution in the case of a sectorial scatterer.
Figure 5B:
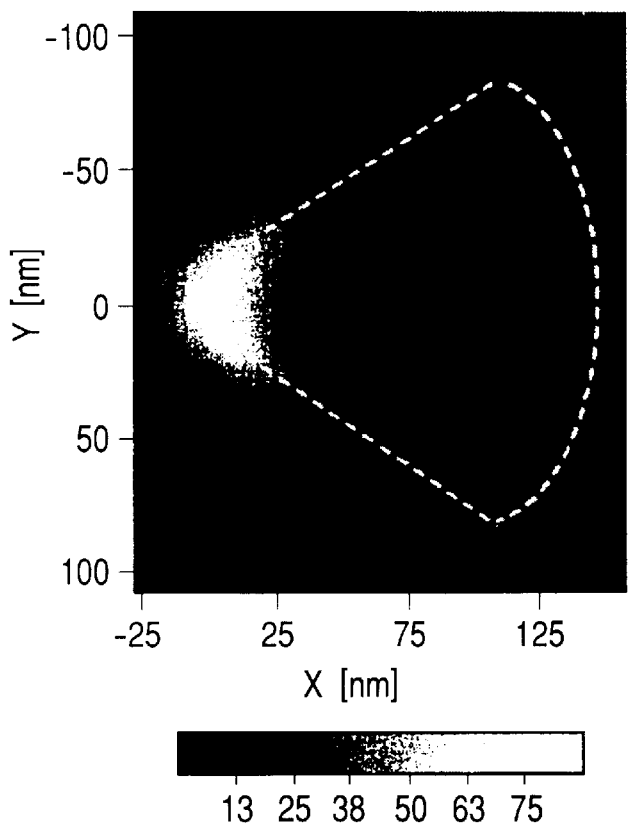

FIG. 5 shows distributions of near field light intensities in the vicinity of triangular and sectorial scatterers obtained in accordance with Finite Difference Time Domain (FDTD) method (Journal of Optical Society of America A, Vol. 12, No. 9, pp. 1974–1983, 1995). FIGS. 5(a) and 5(b) show such distributions in the cases of a triangular scatterer and a sectorial scatterer, respectively. It is here assumed that the scatterers are formed of gold and are placed in air. The radius of curvature $r_1$ thickness, and angle Q of the vertex 12, as well as length $L_1$, were assumed to be 20 nm, 30 nm, 60°, and 150 nm, respectively. In the triangular shape of FIG. 5(a), the radius of curvature of each vertex 31 was set at 30 nm. The wavelength of light is 650 nm in both FIGS. 5(a) and 5(b), and an observation surface was set at a position spaced 10 nm from the scatterer surface. The value of intensity represents the ratio between near field light intensity and incident light intensity. As shown in this figure, a powerful near field light is generated at the vertex 12.

Figure 4A:
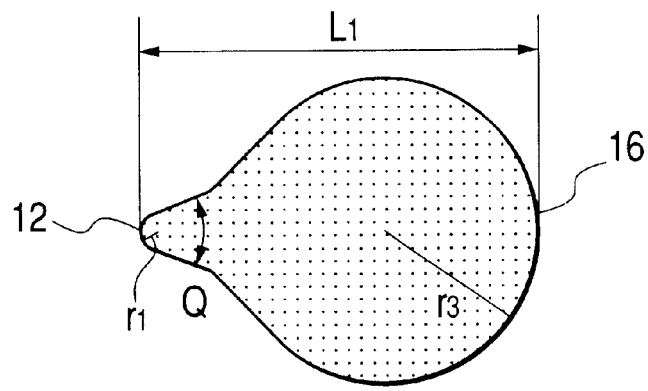
FIG. 4 illustrates scatterers each having a vertex changing in multiple stages, which 4(a) shows a scatterer having a tip of a small angle and 4(b) shows a scatterer having a tip of a large angle.
Figure 4B:
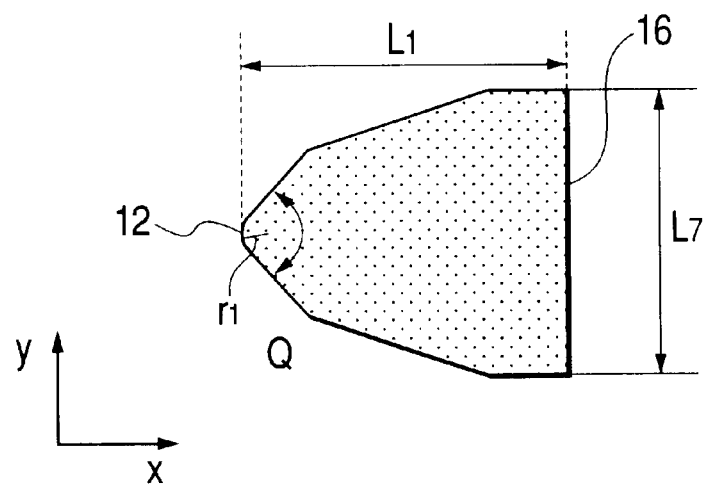

The vertex angle Q may be changed in multiple steps as in FIGS. 4(a) and 4(b). For example, in a scatterer of a combined shape of a tapered shape and a circular shape as in FIG. 3(c), if the angle Q of the near field light generating vertex 12 is set small and the angle of the portion spaced apart from the vertex 12 is set large as in FIG. 4 (a), the radius of curvature $r_3$ of the circular portion can be made large, such that the intensity of near field light generated at the edge portion 16 on the side opposite to the vertex 12 can be made small. Conversely, if the angle Q of the near field light generating vertex 12 is set large and the angle of the portion spaced apart from the vertex is made small as in FIG. 4(b), it is possible to decrease the length $L_7$ of the edge portion located on the side opposite to the near field light generating vertex 12. Consequently, in case of using many scatterers, it is possible to increase the number of scatterers to be arranged, as will be described below.

The intensity of near field light generated at the vertex 12 depends on the dielectric constant of the scatterer concerned (which depends on the material of scatterer and the wavelength of incident light), the shape and size of the scatterer, and further depends on the dielectric constant of an object placed proximate to the scatterer. The state of plasma oscillation generated within the scatterer changes depending on these parameters. For example, when the scatterer is in any of the shapes as shown in FIG. 3, the intensity of near field light generated depends on the dielectric constant of the scatterer (i.e., the material of the scatterer and the wavelength of incident light), the dielectric constant of an object placed around the scatterer, the distance $L_1$ between a tangential line at vertex 12 and a tangential line on the opposite side parallel thereto, and the vertex angle Q.

Figure 6A:
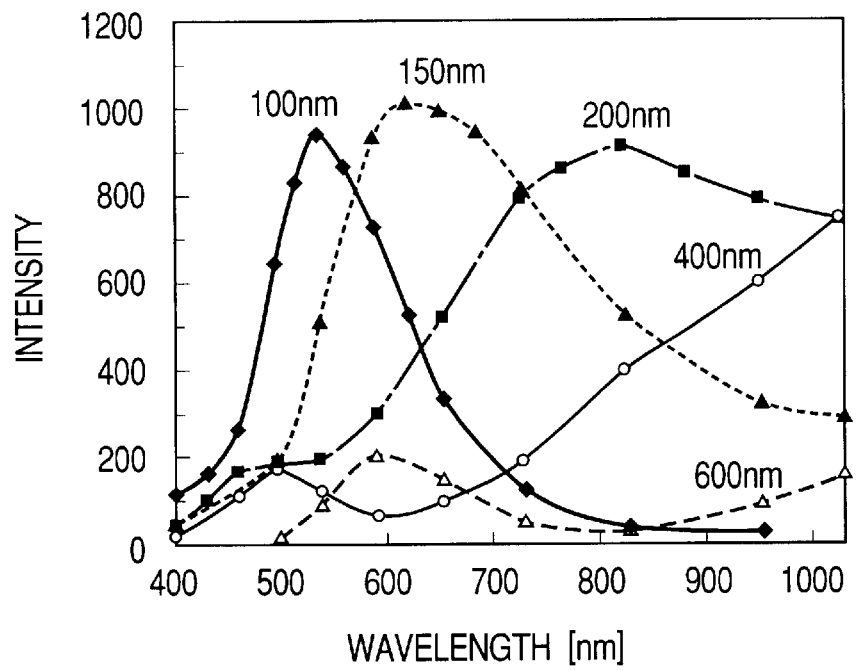
FIG. 6 illustrates a relationship between the length of a scatterer and a resonance characteristic, in which 6(a) shows a relationship between wavelength and near field intensity for each length and 6(b) shows a relationship between dielectric constant and near field intensity for each length.

Reference will now be made to the dependence on length of the scatterer. In a sectorial shaped scatterer as shown in FIG. 3(a), when the length $L_1$ is changed from 100 to 600 nm, the relationship between the intensity of near field light generated at vertex 12 and the wavelength of light changes as in FIG. 6(a). This relationship was determined in accordance with the FDTD method. Here, the scatterer was assumed to be formed of silver, have a thickness of 30 nm, and be placed in air. The diameter of an incident light spot was set at three times the wavelength of light, the radius of curvature $r_1$ of the vertex 12 was set at 20 nm, and the vertex angle Q was set at 60°. The values of near field intensity plotted along the ordinate axis are those obtained at a distance (z in FIG. 1) of 2 nm from the scatterer surface, each representing the ratio between the near field intensity and the incident light intensity.

Figure 6B:
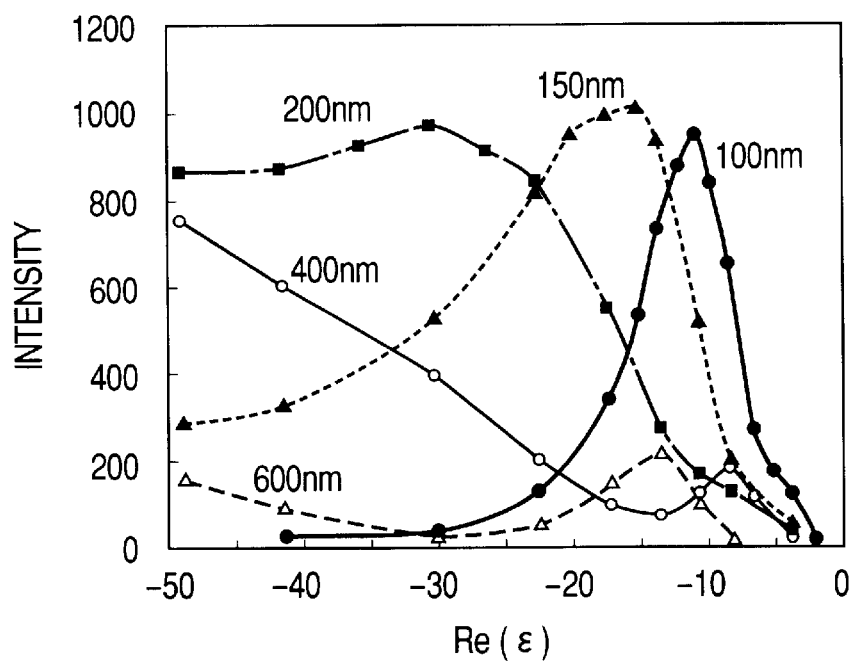

If this figure is converted, using a dispersion relationship of dielectric constant, into a relation between near field intensity and dielectric constant Re (real number part), the result is as shown in FIG. 6(b). Thus, when the length $L_1$ is 100 nm and a real number part of the dielectric constant lies in the vicinity of −10, there occurs plasmon resonance and the near field intensity reaches a maximum. As the length $L_1$ increases, the peak position shifts in the direction of smaller dielectric constant. Further, with an increase in length $L_1$, the width of resonance increases. This is presumed to be because the retardation of phase at various portions of the scatterer becomes more and more influential as the length becomes larger.

The generation efficiency of near field light (the ratio between incident light energy and near field light energy) depends on the NA of the condenser lens used, the refractive index of the material in the vicinity of the scatterer, and the light absorbance, but is assumed to be approximately 10 to 20% at or near the plasmon resonance frequency. In case of applying this probe to an optical recording/reproducing apparatus, for example, and if the recording density is about 1 T/inch$^2$, it is necessary to ensure a data transfer speed of about 1 Gbps, and at this time an efficiency of about 1–2% is required for bit cell reproduction (See, M. Ohtsu ed., Near-field Nano/Atom Optics and Technology, Springer-Verlag, Tokyo, 1998, p209). Therefore, in FIG. 6(b), an intensity range of not less than 10% of peak intensity corresponds to an optimum value of dielectric constant.

For recording a bit cell, an efficiency of about five times the value just mentioned is needed and thus an efficiency of at least about 5 to 10% is required. At this time, an intensity range of not less than 50% of peak intensity corresponds to an optimum value of dielectric constant in FIG. 6(b). For attaining a recording density of at least 10 T/in$^2$, it is necessary to attain a data transfer speed of at least 10 Gbps. In this case, an approximately 10% efficiency is required for bit cell reproduction. At this time, an intensity range of not less than 80% of peak intensity corresponds to an optimum value of dielectric constant in FIG. 6(b).

Figure 7A:
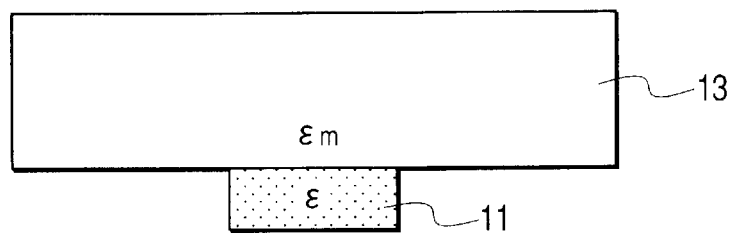
FIG. 7 illustrates the disposition of a scatterer with respect to a substrate, in which 7(a) shows the scatterer as formed on a surface of the substrate and 7(b) shows the scatterer as buried in the substrate.
Figure 7B:
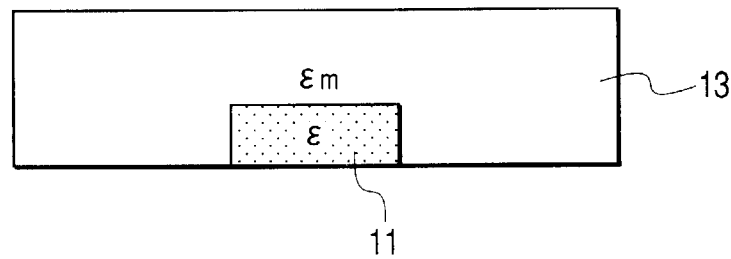
Figure 8:
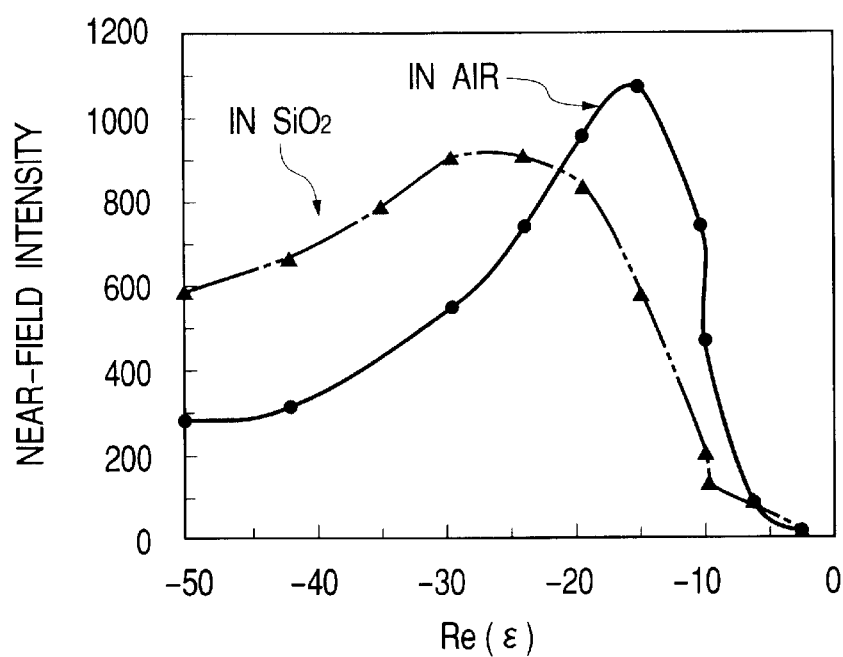
FIG. 8 illustrates a resonance characteristic obtained when an $SiO_2$ substrate is disposed in the vicinity of a scatterer.

As shown in FIG. 7(a) or 7(b), if an object having a dielectric constant value of $e_m$ is placed in the vicinity of a scatterer, an optimum range of the dielectric constant changes. For example, a resonance characteristic in the case of the object 13 being SiO$_2$ (dielectric constant $e_m$=2) is shown in FIG. 8. The dielectric constant which induces such resonance becomes $e_m$ times as large as the value obtained in the absence of the object 13.

Figure 9:
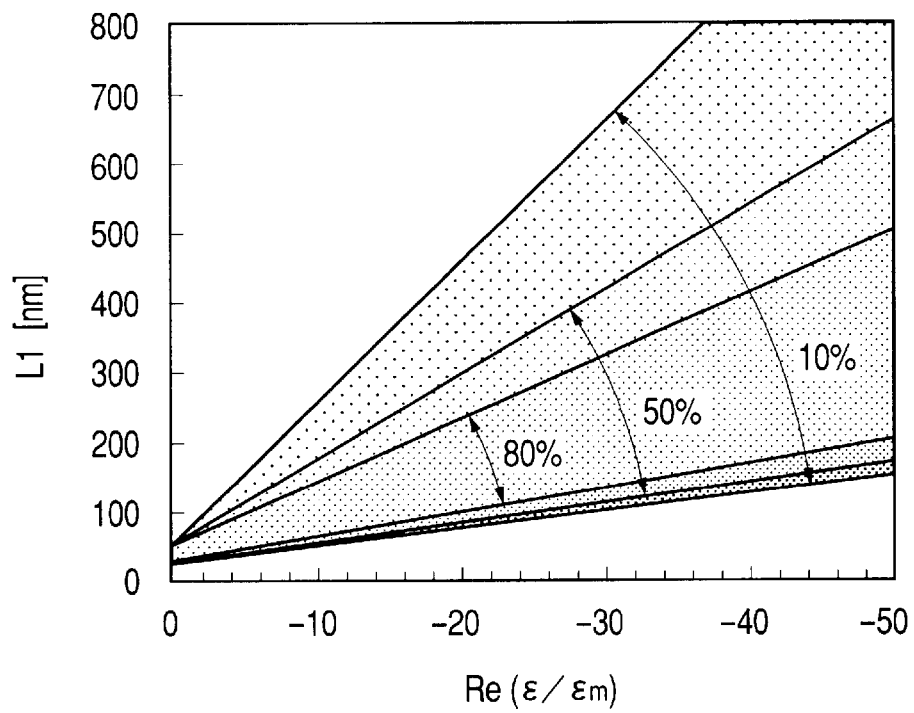
FIG. 9 illustrates a relationship between dielectric constant and an optimum length with respect to a scatterer and a substrate disposed in the vicinity thereof.

The above optimum ranges of dielectric constant are together shown in FIG. 9, in which a boundary between optimum regions is approximated by a straight line. The optimum ranges can be represented in terms of the following expressions (as optimum ranges of length):

(1) When the near field intensity is 10% of peak intensity:

$$(-2.5\times(e/e_m)+30) < L_1 < (-2\times(e/e_m)+50)$$

(2) When the near field intensity is 50% of peak intensity:

$$(-3\times(e/e_m)+30) < L_1 < (-12.5\times(e/e_m)+50)$$

(3) When the near field intensity is 80% of peak intensity:

$$(-3.5\times(e/e_m)+30) < L_1 < (-9\times(e/e_m)+50)$$

As shown in FIG. 6(b), when the length becomes at least 400 nm, a second resonance point is generated in a region of a large dielectric constant. For example, when the length is 400 nm, a peak exists at a position of about −10 in dielectric constant. This resonance point may be used if an efficiency of about 1–2% suffices. That is, the length $L_1$ may be set in the following range:

$$(-70\times(e/e_m)-850) < L_1 < (-90\times(e/e_m)+50)$$

Figure 10:
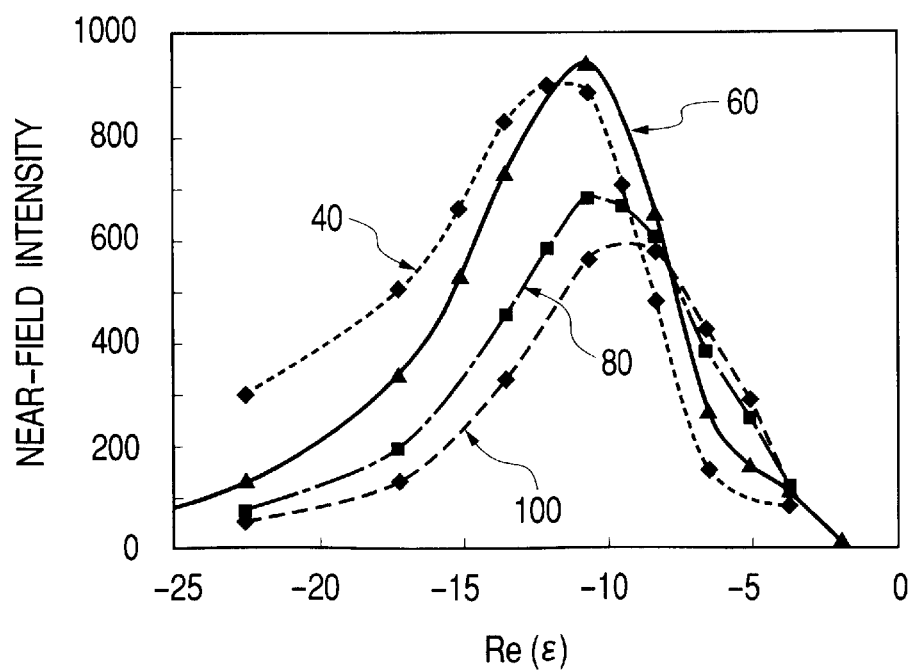
FIG. 10 illustrates a relationship between the angle of a near field light generating vertex and a resonance characteristic.

Reference will now be made to the dependence on the angle of vertex 12. In a sectorial scatterer as shown in FIG. 3(a), when the angle Q of the vertex 12 is changed from 40° to 100°, the relationship between near field intensity and the dielectric constant changes in the manner depicted in FIG. 10 which shows the results of calculation made in accordance with the FDTD method. The scatterer is assumed to be formed of silver, have a thickness of 30 nm, a vertex radius of curvature $r_1$ of 20 nm, and a length $L_1$ of 150 nm.

The diameter of an incident light spot was set at three times the wavelength of light. The values of near field intensity plotted along the ordinate axis are those obtained at a distance z from the scatterer of 2 nm, representing the ratio between near field intensity and incident light intensity. As shown in this figure, when the angle is made small, an optimum dielectric constant becomes slightly larger. Taking this angle dependence into account, optimum values of the length $L_1$ become as follows:

(1) When the near field intensity is 10% of peak intensity:

$$(-2.5\times(e/e_m+A)+30) < L_1 < (-20\times(e/e_m+A)+50)$$

(2) When the near field intensity is 50% of peak intensity:

$$(-3\times(e/e_m+A)+30) < L_1 < (-12.5\times(e/e_m+A)+50)$$

(3) When the near field intensity is 80% of peak intensity:

$$(-3.5\times(e/e_m+A)+30) < L_1 < (-9\times(e/e_m+A)+50)$$

(4) In case of utilizing the second resonance point:

$$(-70\times(e/e_m+A)-850) < L_1 < (-90\times(e/e_m+A)+50)$$

In the above expressions, A stands for a coefficient dependent on angle and is in the following relation to angle Q of the vertex 12:

$$A = -0.05 \times Q + 3$$

The near field intensity decreases as the angle Q of the vertex 12 becomes greater than 80°. When a high efficiency of not lower than 10% as noted above is required, it is preferable that the angle Q be set not larger than 80°. However, if the angle is too small, the near field intensity at the edge 16 located on the side opposite to the vertex 12 will also become high. In order for the intensity at edge 16 to be one half or less of the intensity at vertex 12 it is preferable that the angle be set at 30° or more.

Figure 11A:
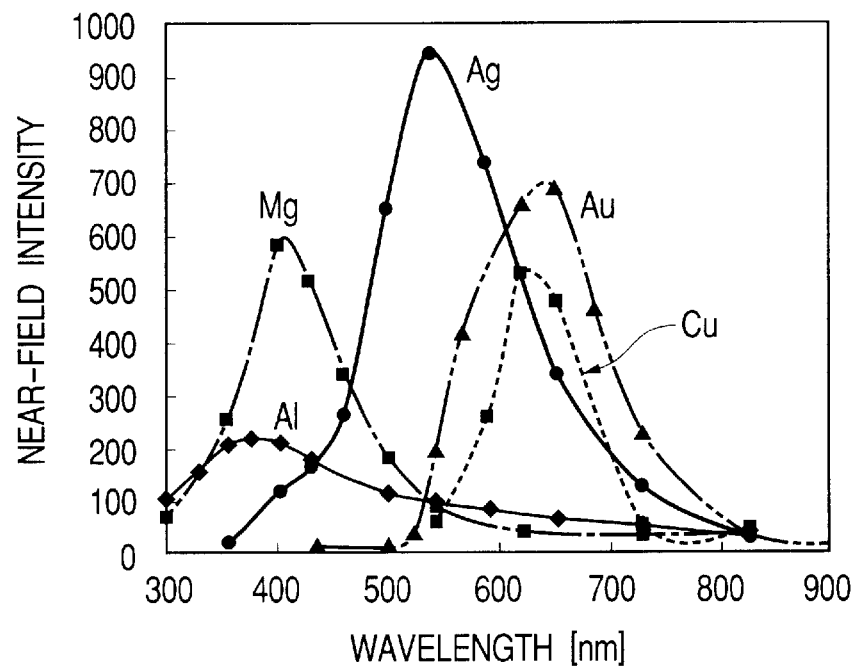
FIG. 11 illustrates resonance characteristics obtained using gold, silver, copper, aluminum, and magnesium as scatterer materials, in which 11(a) shows a relationship between wavelength and near field intensity and 11(b) shows a relationship between dielectric constant and near field intensity.
Figure 11B:
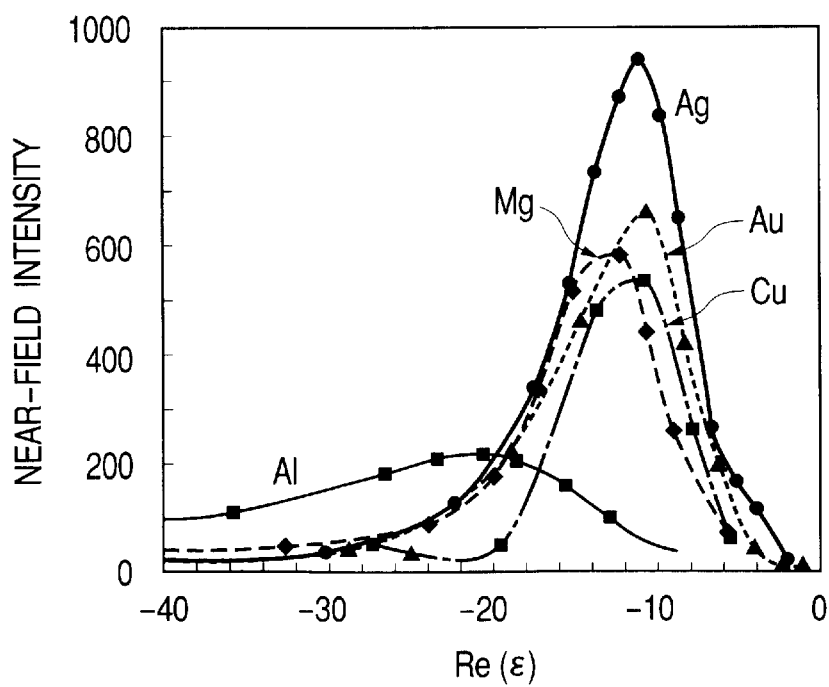

The above calculation results are based on the assumption that the material of the scatterer is silver. If the material is replaced with another metal, the above relation differs. FIG. 11(a) shows wavelength—near field intensity relationships with the use of aluminum, gold, silver, and magnesium as metallic materials of the scatterer. In this case, the scatterer is assumed to have a thickness of 30 nm, a radius of curvature $r_1$ of 20 nm at its near field light generating vertex, a vertex angle of 60°, and a length $L_1$ of 100 nm. If these relationships are converted to relationships between the real number part of dielectric constant and near field intensity, the results are as shown in FIG. 11(b).

Thus, the value of dielectric constant corresponding to the maximum near field light differs according to materials. This is presumed to be because the wavelength—dielectric constant relation (dispersion relation) differs for each material. That is, even if the value of dielectric constant is the same, the wavelength which affords it differs depending on the material used. For example, the wavelength which affords a dielectric constant of −15 is about 700 nm in the case of silver, but it is 350 nm in the case of aluminum. As the ratio between length $L_1$ and wavelength decreases, the characteristics of plasmon resonance vary under the influence of retardation. Thus, even at the same dielectric constant, if the wavelength is different, the susceptibility to retardation differs, so that the resonance characteristic of plasmon is presumed to differ.

The above difference in characteristics caused by the difference of material can be corrected by multiplying an approximate value by a correction coefficient.

That is, an optimum value of length $L_1$ is expressed as follows:

(1) When the near field intensity is 10% of peak intensity:

$$Px(-2.5\times(e/e_m+A)+30) < L_1 < Px(-20\times(e/e_m+A)+50)$$

(2) When the near field intensity is 50% of peak intensity:

$$Px(-3\times(e/e_m+A)+30) < L_1 < Px(-12.5\times(e/e_m+A)+50)$$

(3) When the near field intensity is 80% of peak intensity:

$$Px(-3.5\times(e/e_m+A)+30) < L_1 < Px(-9\times(e/e_m+A)+50)$$

(4) In case of utilizing the second resonance point:

$$Px(-70\times(e/e_m+A)-850) < L_1 < Px(-90\times(e/e_m+A)+50)$$

In these expressions, P stands for a coefficient which is dependent on the material of the scatterer used. For example, the coefficient P is 0.5 at an aluminum content of 70% or more, 0.8 at a magnesium content of 70% or more, 1 at a gold content of 70% or more, 1 at a copper content of 70% or more, and 1 at a silver content of 70% or more.

Second Exemplary Embodiment

The following description is now provided about the position of scatterer. In a case of approximating the above probe to a sample or a recording medium (e.g., a magneto-optic medium such as TeFeCo or a phase-change medium such as GeSbTe), the position of resonance changes because of a significant interaction between the near field light of the probe and the sample or the medium. As an example, FIG.

Figure 12A:
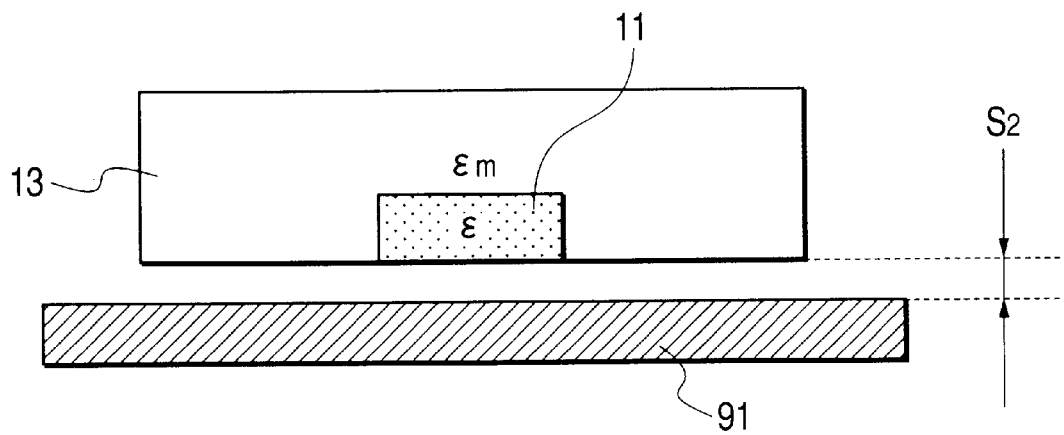
FIG. 12 illustrates resonance characteristics obtained when a medium or a sample is disposed in the vicinity of a scatterer, in which 12(a) shows how to dispose a medium and 12(b) shows resonance characteristics obtained in the absence of a medium or using $SiO_2$, TeFeCo, and GeSbTe as samples or mediums.
Figure 12B:
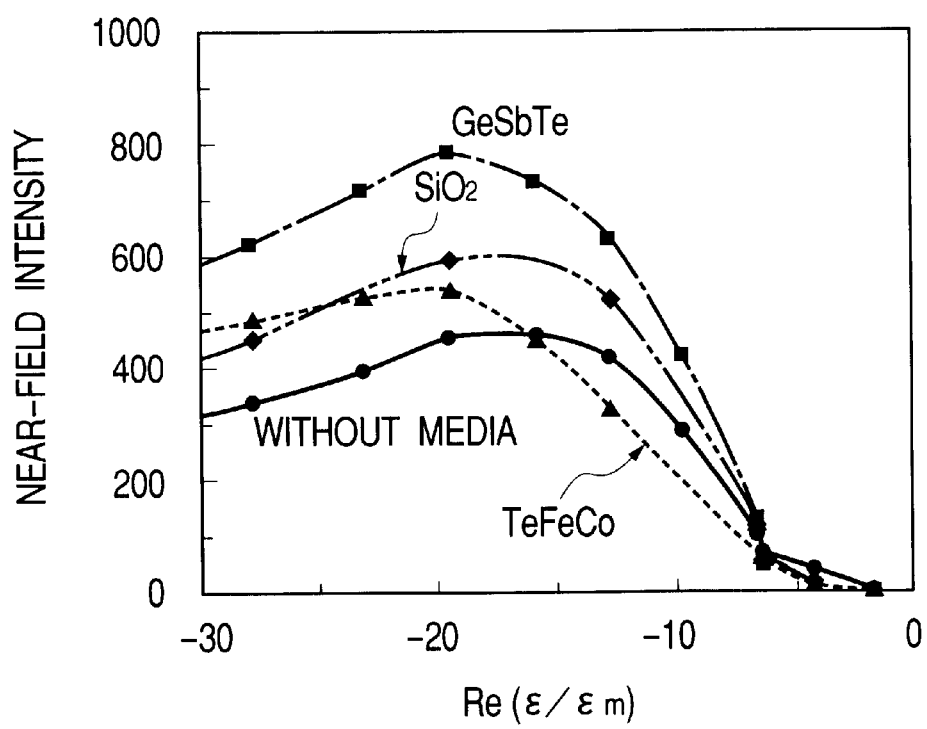

12(b) shows resonance characteristics obtained when a scatterer 11 embedded in a substrate 13 as in FIG. 12(a) was approximated to TeFeCo, GeSbTe, or $SiO_2$ substrate, and when it was not approximated to the substrate. In the calculation concerned, the scatterer was assumed to be in a sectorial shape, have a length $L_1$ of 150 nm, a vertex radius of curvature $r_1$ of 20 nm, and a thickness of 30 nm. Further, the substrate material 13 was assumed to be $SiO_2$, and the probe-medium distance $S_2$ was assumed to be 10 nm.

Thus, in the case where the medium to which the probe is approximated is a metal or a semiconductor, the dielectric constant at which the near field intensity becomes maximum shifts to the negative side. At this time, therefore, optimum values of length $L_1$ are represented as follows:

(1) When the near field intensity is 10% of peak intensity:

$$Px(-2.5\times(e/e_m+A+M)+30)<L_1<Px(-20\times(e/e_m+A+M)+50)$$

(2) When the near field intensity is 50% of peak intensity:

$$Px(-3\times(e/e_m+A+M)+30)<L_1<Px(-12.5\times(e/e_m+A+M)+50)$$

(3) When the near field intensity is 80% of peak intensity:

$$Px(-3.5\times(e/e_m+A+M)+30)<L_1<Px(-9\times(e/e_m+A+M)+50)$$

(4) In case of utilizing the second resonance point:

$$Px(-70(e/e_m+A+M)-850)<L_1<Px(-90\times(e/e_m+A+M)+50)$$

In these expressions, M represents a shift quantity which is determined by the material of a sample or a medium.

The value of M is 0 in the absence of any object for approach, 0 in the presence of a dielectric as the object for approach, and 5 in the presence of a metal or a semiconductor as the object for approach. The "dielectric" indicates a substance whose electric conductivity is not higher than $10^{-7}$ S·m$^{-1}$. Although the above optimum conditions are of the case where the scatterer's shape is sectorial, there were obtained similar results with such other shapes as shown in FIGS. 3(b), 3(c), and 3(d).

Figure 13:
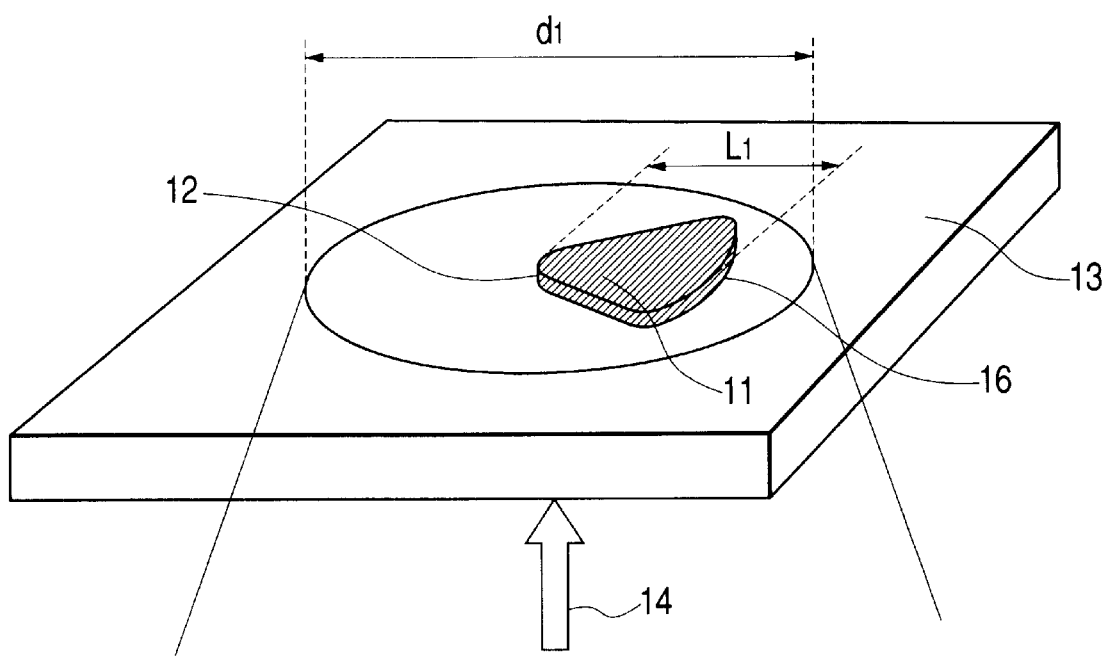
FIG. 13 illustrates a method for introducing light.

A central position of light incident on the scatterer is made substantially coincident with the center of the scatterer as in FIG. 1 so as to afford a maximum light intensity on the scatterer. Alternatively, for making the position corresponding to the maximum near field intensity and the central position of incident light coincident with each other, the central position of incident light may be rendered substantially coincident with the near field light generating vertex 12 as in FIG. 13.

Third Exemplary Embodiment

Figure 14A:
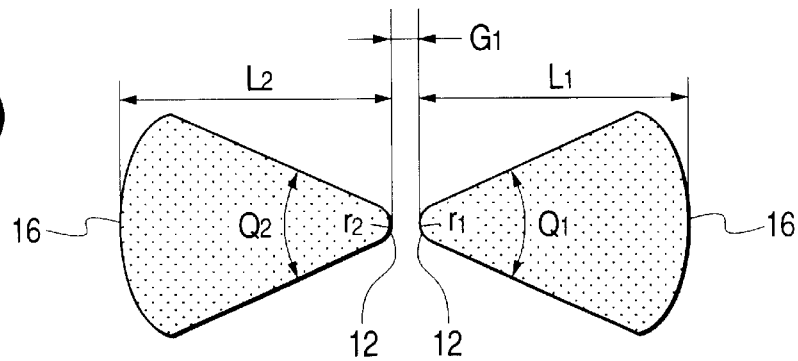
FIG. 14 illustrates the disposition of scatterers as a combination of two tapered scatterers, in which 14(a) shows a case where scatterers of an equal size are disposed in opposition to each other, 14(b) shows a case where scatterers of different sizes are disposed in opposition to each other, and 14(c) shows a case where scatterers are disposed at right angles to each other.

A description will be now given about the case where two or more scatterers are provided. For further enhancing the near field intensity, a second scatterer having electric conductivity may be formed in the vicinity of the near field light generating vertex of the scatterer. In this case, if the spacing between the near field light generating vertex of one scatterer and the other scatterer is set smaller than the wavelength of light, electric charges generated in the scatterers interact, with a consequent generation of a powerful near field light between both scatterers. For the generation of a powerful near field light, as shown in FIG. 14(a), it is preferable that the other scatterer be also such a tapered filmy scatterer as shown in FIGS. 3 and 4.

Figure 15:
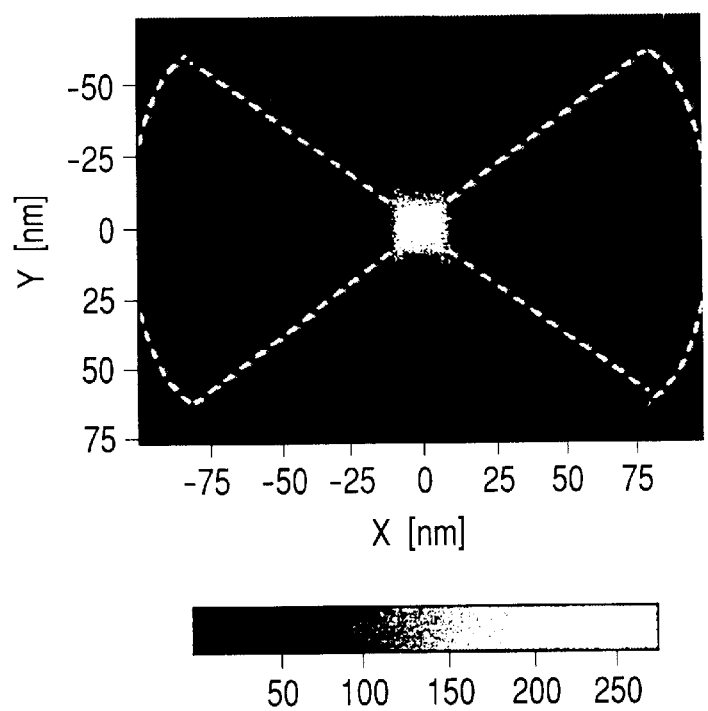
FIG. 15 illustrates a near field intensity distribution in the vicinity of two sectorial scatterers combined together.

FIG. 15 shows a near field intensity distribution at a position spaced 5 nm from the surface of a combination of two scatterers having the same shape. In this case, the following conditions were adopted: scatterer shape: sectorial; scatterer material: gold; length $L_1=L_2=100$ nm; vertex angle $Q_1=Q_2=60°$; tip radius of curvature $r_1=r_2=20$ nm; vertex-to-vertex spacing $G_1=8$ nm, wavelength of incident light=780 nm. By thus combining two scatterers, a powerful near field light is generated between two vertexes.

Figure 16:
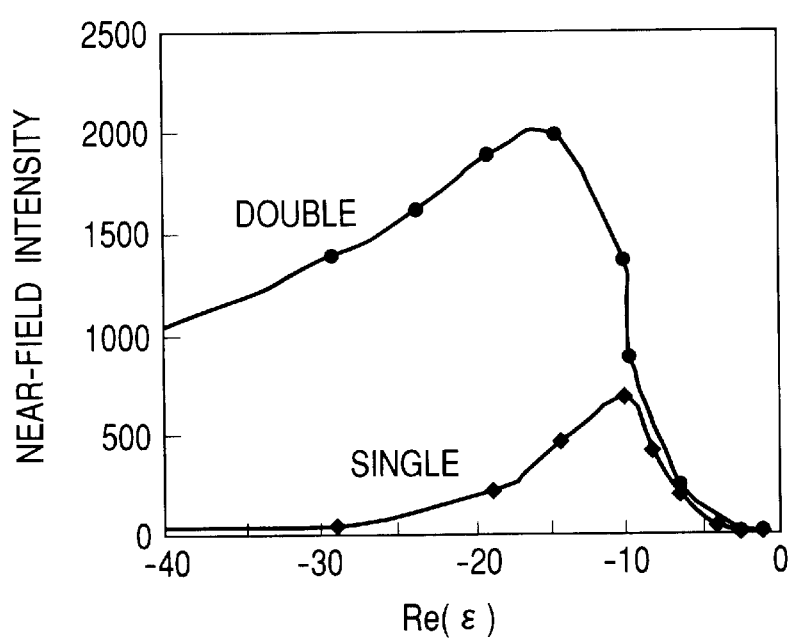
FIG. 16 illustrates a resonance characteristic obtained using two sectorial scatterers combined together.

FIG. 16 shows a relationship between near field intensity and wavelength in the above combined scatterer. As a result of interaction of electric charges concentrated on vertexes 12 of the two scatterers, the dielectric constant for a high near field intensity shifts to the negative side in comparison with the use of a single scatterer. In this case, optimum values of length $L_1$ (=$L_2$) are represented by the following expressions:

(1) When the near field intensity is 10% of peak intensity:

$$Px(-2.5\times(e/e_m+M+A)-20)<L_1<Px(-20)\times(e/e_m+M+A)$$

(2) When the near field intensity is 50% of peak intensity:

$$Px(-3\times(e/e_m+M+A)-20)<L_1<Px(-12.5)\times(e/e_m+M+A)$$

(3) When the near field intensity is 80% of peak intensity:

$$Px(-3.5\times(e/e_m+M+A)-20)<L_1<Px(-9)\times(e/e_m+M+A)$$

(4) In case of utilizing the second resonance point:

$$Px(-70\times(e/e_m+M+A)-900)<L_1<Px(-90)\times(e/e_m+M+A)$$

In these expressions, P represents a coefficient dependent on the material of scatterer, A represents a coefficient dependent on the angle of a near field light generating vertex, and M represents a coefficient dependent on the medium, all of which take the same values as in the case of a single scatterer.

Figure 14B:
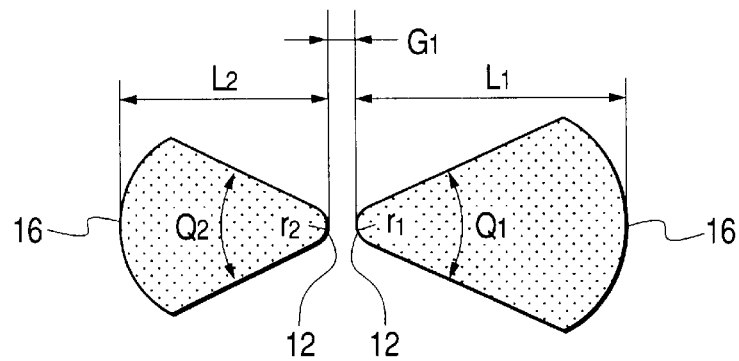
Figure 14C:
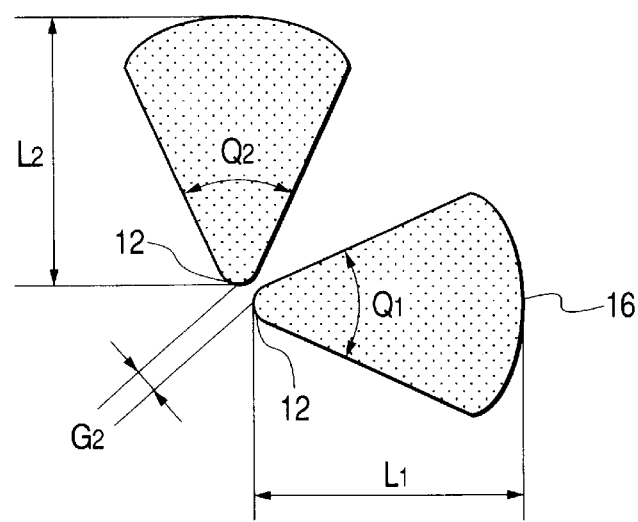

In case of combining two scatterers, the scatterers may be made different in plasmon resonance frequency (a resonance frequency used when each scatterer is present alone) for correspondence to two lasers with different wavelength. For example, as shown in FIG. 14(b), lengths $L_1$ and $L_2$, or vertex angles $Q_1$ and $Q_2$, are set at different values. By so doing, since the respective scatterers have originally different resonance characteristics, one or two resonance points are obtained, and the width of resonance wavelength (the width of optimum dielectric constant) increases.

In the case where a single scatterer is used, the polarization direction of incident light is limited to one direction. But if two scatterers are disposed orthogonal to each other, two orthogonal directions are allowed as the polarization directions of incident light. In this case, adjustment is made so that the scatterers become equal, in plasmon resonance frequency (lengths $L_1$, $L_2$ and angles $Q_1$, $Q_2$ are made equal respectively). Positions of the respective vertexes are preferably as close as possible to each other in order to minimize a positional deviation of a light spot upon a change of polarization. In this embodiment the spacing $G_2$ was set at 10 nm. In the case where the scatterers are made different in plasmon resonance frequency (for example, lengths $L_1$ and $L_2$, or angles $Q_1$ and $Q_2$, are made different), the wavelength of incident light is changed for each polarization direction.

Figure 17:
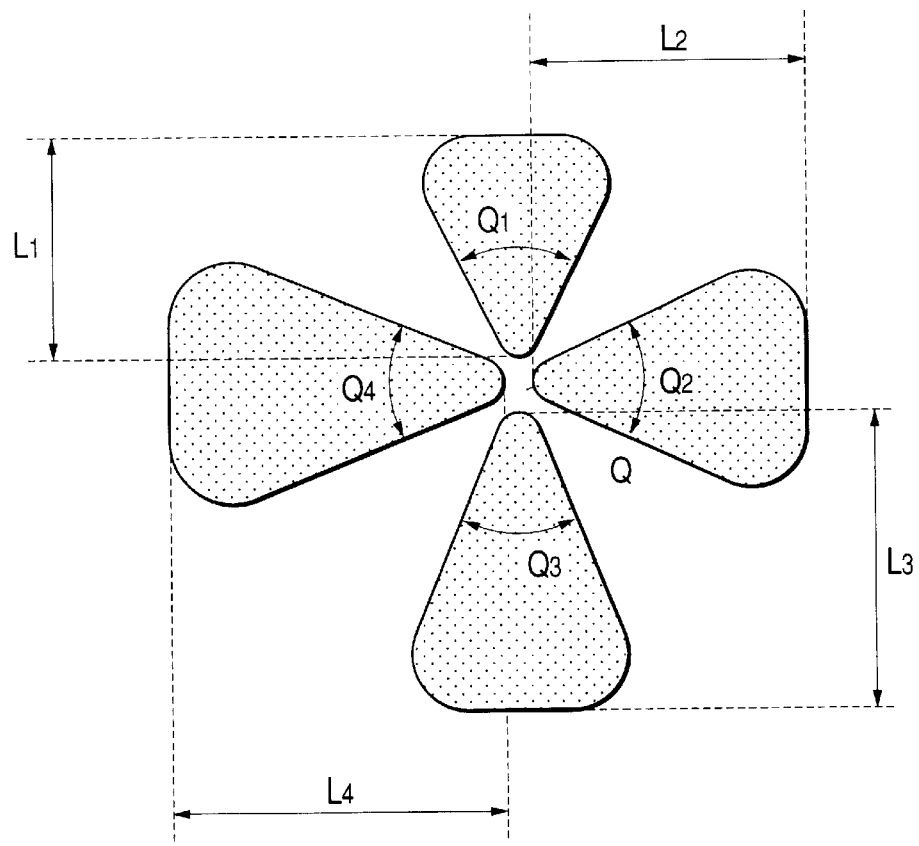
FIG. 17 illustrates the disposition of two or more tapered scatterers combined together.

In the case of scatterers as shown in FIGS. 3 and 4, which are tapered toward respective vertices, three or more of these scatters may be combined (four in FIG. 17). In this case, if the scatterers are made different in plasmon resonance frequency (for example, lengths $L_1$, $L_2$, $L_3$, $L_4$, or angles $Q_1$, $Q_2$, $Q_3$, $Q_4$, are set at different values), a plurality of different values are allowed as wavelengths of incident light. For minimizing a positional deviation of a light spot, it is preferable that the positions of the respective scatterers' near field light generating vertexes be as close as possible to each other. In this embodiment, the spacing between both vertexes is set at 10 nm.

Figure 18:
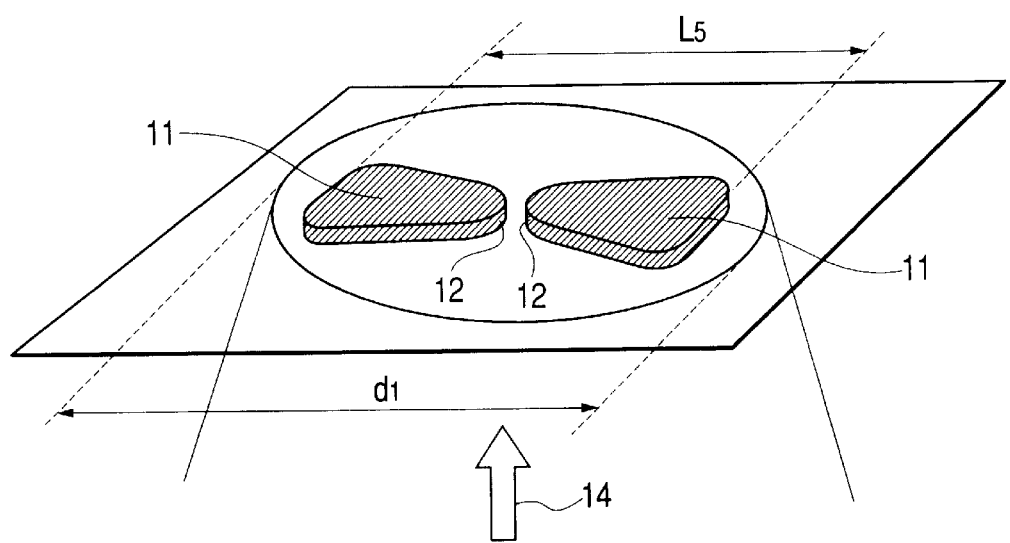
FIG. 18 illustrates how to apply light to two or more tapered scatterers combined together.

In a case of combining two scatterers referred to above, as shown in FIG. 18, it is preferable that a central position of a light spot be made substantially coincident with a point at which the total of distances from the respective vertexes becomes minimum.

Thus, in the case where two or more scatterers which are tapered toward the respective near field light generating vertexes are combined together, the total of the respective scatterers' areas is made smaller than the light spot area (in terms of length, a longest width portion $L_5$ of the regions where the scatterers are present is made shorter than the light spot diameter $d_1$). For keeping the phase of light uniformly incident on the scatterers, the total of the respective scatterers' areas is made smaller than the square of the wavelength of incident light (in-terms of length, the longest width portion $L_5$ of the scatterers' present region is made smaller than the wavelength of incident light).

Also in the case of combining two or more scatterers, as in the case of using only one scatterer, if the light spot diameter is too large in comparison with the scatterers' areas, a lowering of efficiency results. For example, in case of application to an optical recording/reproducing apparatus, it is necessary that the area of a light spot be not larger than one hundred times the total area of the scatterers (in terms of length, it is necessary that the spot diameter be not larger than ten times the longest width portion of the scatterers' present regions), for the same reason as in the case of using only one scatterer.

In both cases of using only one scatterer and using two or more scatterers, the scatterers may be formed so as to project onto a plane substrate as in FIG. 7(a) or may be buried in the surface of a plane substrate as in FIG. 7(b). Particularly, when it is necessary to let the probe scan at high speed as in optical recording or reproduction, it is preferable that the scatterers be buried as in FIG. 7(b) for the purpose of preventing wear of the scatterers.

Figure 19:
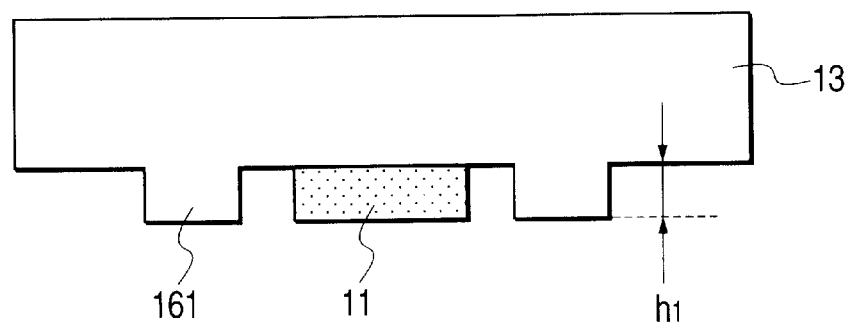
FIG. 19 illustrates a probe with pad formed near a scatterer.

For the same purpose, a pad 161 may be formed around a scatterer, as shown in FIG. 19. In this case, it is preferable to set the height $h_1$ of the pad 161 such that the scatterer surface and the pad surface are substantially flush with each other. It is optional whether the pad 161 is to be formed using the same material as that of the substrate 13 or to be formed using a material different from that of the substrate.

Figure 20:
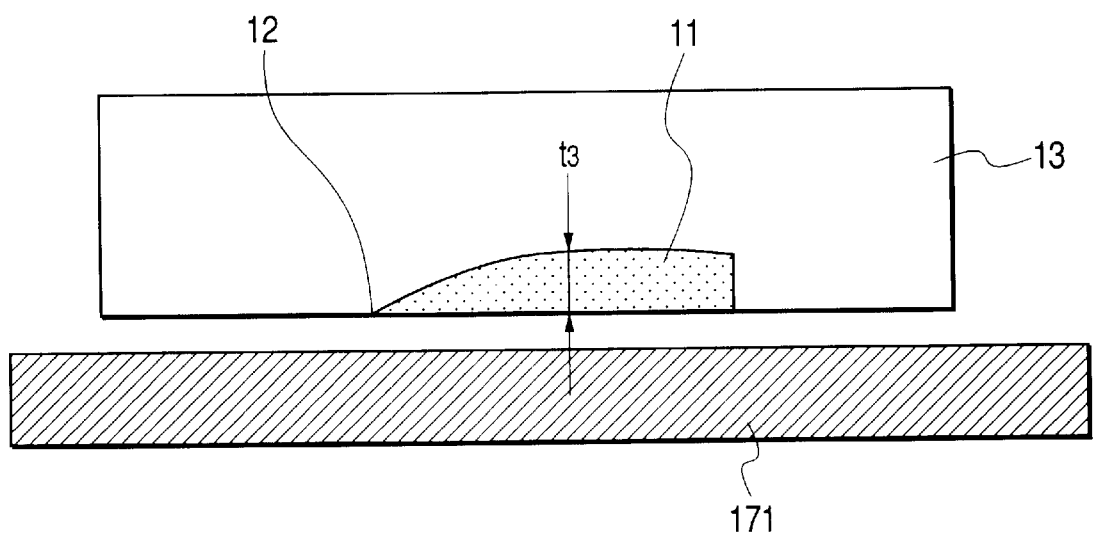
FIG. 20 illustrates a scatterer whose thickness is smaller toward a near field light generating vertex.

Irrespective of whether the number of scatterer is one or two or more, the scatterer thickness may be different at different locations in the scatterer. Particularly, as shown in FIG. 20, if the thickness $t_3$ is made smaller gradually toward a vertex 12, there occurs a concentration of electric charge also in a direction perpendicular to the scatterer surface and the electric charge is concentrated more efficiently on the vertex 12, thus permitting generation of a more powerful near field light.

Fourth Exemplary Embodiment

In the case of detecting the power of light having passed through the probe in order to detect the shape of a sample or the presence or absence of a bit cell formed on a recording medium, light which has not impinged (made incident) on a scatterer is detected as it is by a detector. This light acts as background light, causing a lowering of the S/N ratio in the detection. To avoid such an inconvenience, it is preferable that a light shielding, or opaque, film 182 be formed near the scatterer. The "opaque film" is defined to be a film having a light transmittance of not higher than 50%. As the material of the opaque film there is used, for example, a metal such as gold or silver, a semiconductor such as Si or GaAs, or a dielectric such as carbon. As seen in FIG. 20, by setting the spacing $W_1$ between the scatterer and the opaque film at a value (50 nm in this embodiment) of not longer than the wavelength of light, it is possible to suppress the occurrence of background light. If a light absorbing film (a film low in both transmittance and reflectance, herein defined to be a film of not more than 50% in both transmittance and reflectance) is used as the opaque film, it is possible to suppress the occurrence of background light not only in an apparatus of illumination mode in which probe-transmitted light is detected but also in an apparatus of illumination-collection mode in which light returning to the light source side is detected.

Figure 21A:
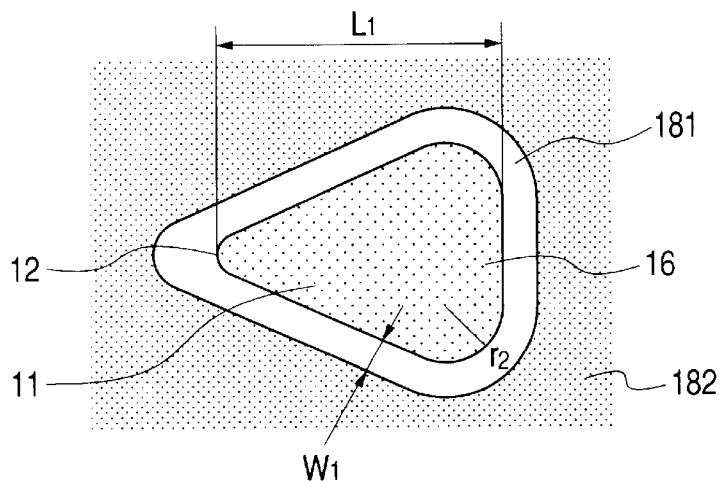
FIG. 21 illustrates probes with an opaque film formed near a scatterer, in which 21(a) shows a case where the scatterer and the opaque film are spaced from each other, 21(b) shows a case where the scatterer and the opaque film are partially connected with each other, and 21(c) shows a case where the scatterer and the opaque film are connected together throughout the whole surface.
Figure 21B:
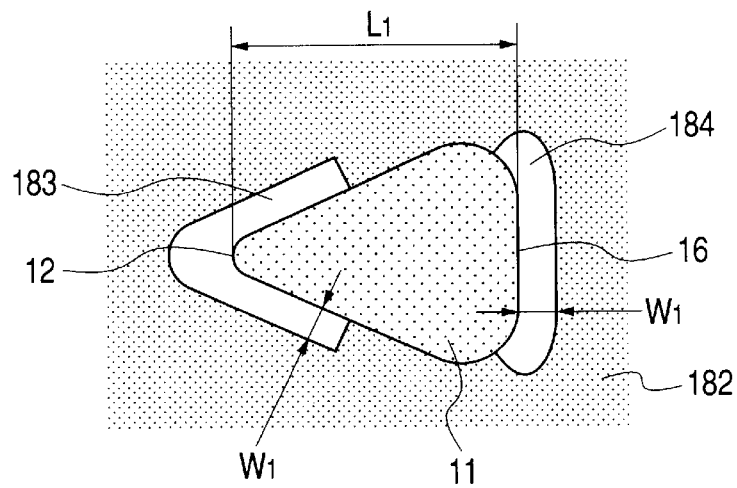

As shown in FIG. 21(b), the opaque film 182 may be bonded to the scatterer 11 at a portion of the scatterer other than a vertex portion 12 and an edge portion 16 (a portion where an electric charge having polarity opposite to that of an electric charge concentrated on the vertex 12) located on the side opposite to the vertex portion.

Figure 21C:
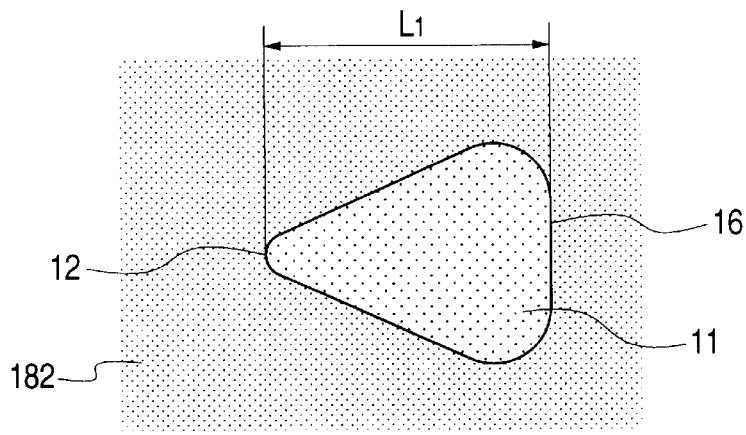

If the opaque film is not electrically conductive, the scatterer 12 and the opaque film 182 may be arranged for complete contact with each other as in FIG. 21(c). The opaque film 182 may be formed using the same material as that of the scatterer 11.

Figure 22A:
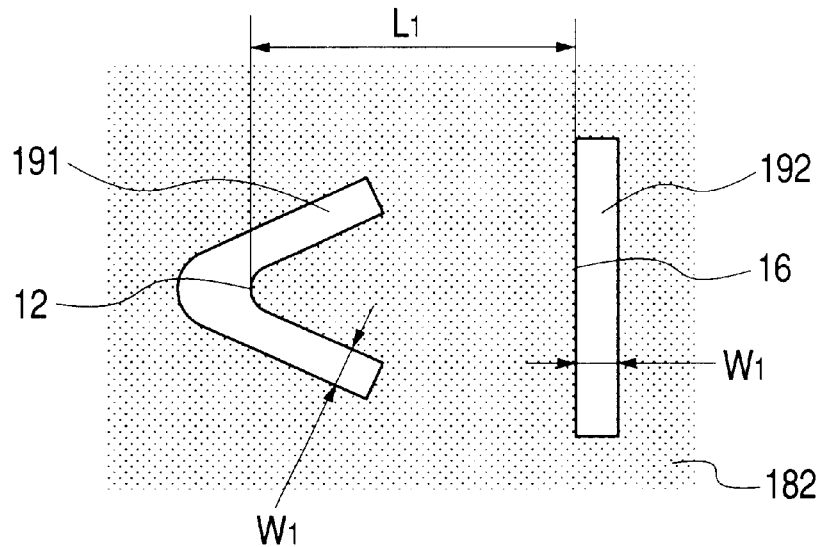
FIG. 22 illustrates probes in which a scatterer and an opaque film are formed using the same material and a V-shaped aperture is formed in a near field light generating vertex, while a linear aperture 22(a) or a curvilinear aperture 22(b) is formed on an opposite side.
Figure 22B:
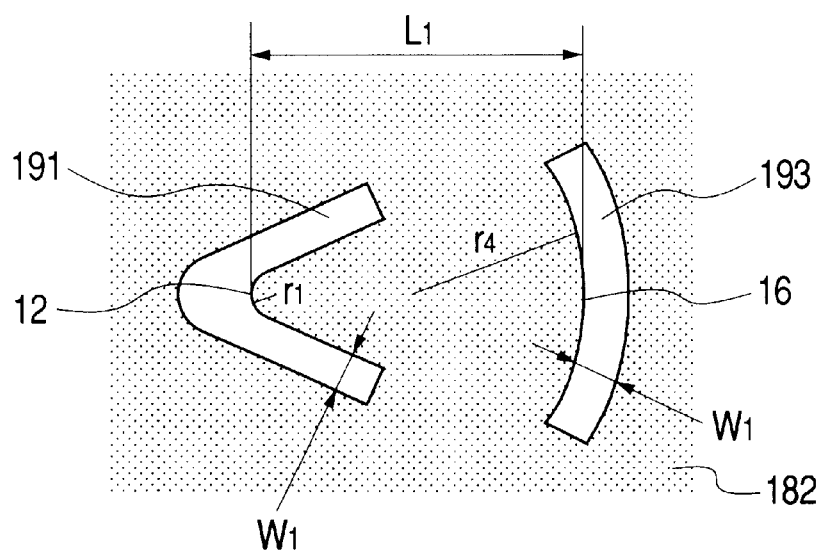

For example, a V-shaped aperture 191 (corresponding to the vertex 12) and a rectilinear aperture 192 (corresponding to the edge 16 on the side opposite to the vertex) as in FIG. 22(a) or a curviliner aperture 193 as in FIG. 22(b), both having a width $W_1$ of not larger than the wavelength of light, are formed in the opaque film 182 which is electrically conductive. The two apertures are spaced from each other such that the distance $L_1$ from the vertex 12 to the opposite-side edge 16 matches the foregoing plasmon resonance condition. The radius of curvature $r_4$ of the curvilinear aperture 193 is set larger than the radius of curvature $r_1$ of the vertex 12.

Figure 23A:
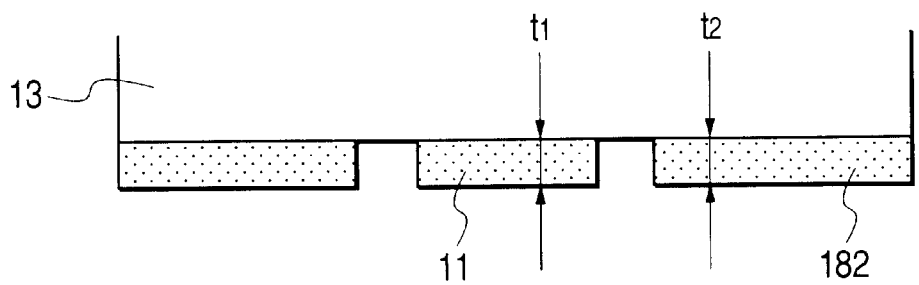
FIG. 23 illustrates a relationship in thickness between a scatterer and an opaque film, in which 23(a) shows a case where the thickness of the scatterer and that of the opaque film are substantially equal to each other, 23(b) shows a case where the thickness of the opaque film is larger than that of the scatterer, and 23(c) shows a case where the thickness of the opaque film is smaller than that of the scatterer.
Figure 23B:
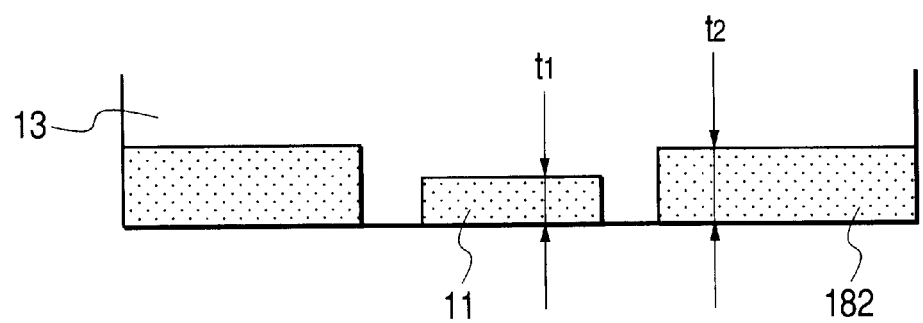
Figure 23C:
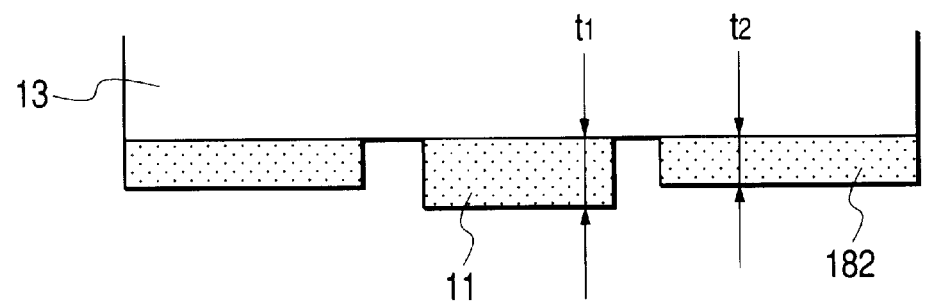

As shown in FIG. 23(a), if the thickness $t_2$ of the opaque film 182 is made equal to the thickness $t_1$ of the scatterer 11, the opaque film can be prevented from collision with a sample or a recording medium and resultant damage. The opaque film may be made thick so as to meet the relation of $t_2 < t_1$ as in FIG. 23(b). In this example, $t_1$ and $t_2$ were set at 30 nm and 100 nm, respectively. By this setting, it is possible to improve the light shielding property of the opaque film and suppress the occurrence of background light to a greater extent. As shown in FIG. 23(c), the scatterer may be made thick so as to meet the relation of $t_2 < t_1$. In this example, $t_1$ and $t_2$ were set at 100 nm and 50 nm, respectively. By this setting, it becomes easier for the scatterer to approach a sample and the measurement of a sample having concave and convex portions is facilitated.

Figure 24A:
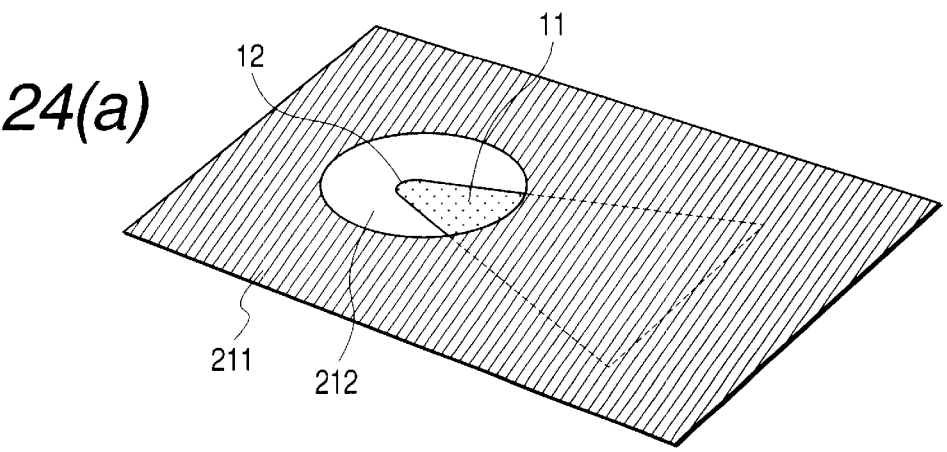
FIG. 24 illustrates a probe wherein a layer of an opaque film having an aperture is formed in the vicinity of a scatterer-placed layer, in which 24(*a*) is a perspective view and 24(*b*) is a side view.
Figure 24B:
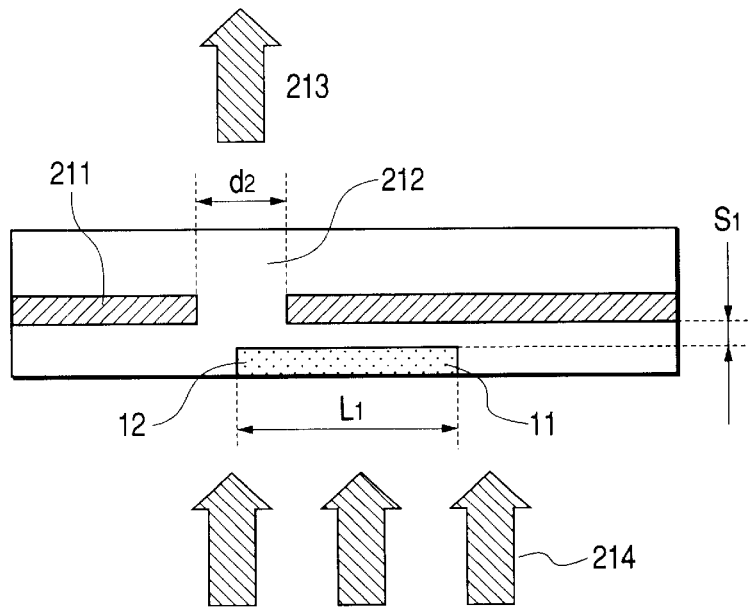

For suppressing the occurrence of background light, a scatterer and an opaque film may be formed in separate layers as in FIG. 24. More specifically, an opaque film 211 having an aperture 212 of a diameter $d_2$ not larger than the wavelength of light incident on a scatterer 11 is formed at a position spaced a distance $s_1$ from the scatterer. The aperture 212 is positioned such that a central position thereof is substantially coincident with the position of a near field light generating vertex of the scatterer and such that, when light is made incident in the direction indicated at 214, only scattered light which is generated at the vertex passes through the aperture. The thus-transmitted light, indicated at 213, is detected by an upper portion of the probe.

Figure 25:
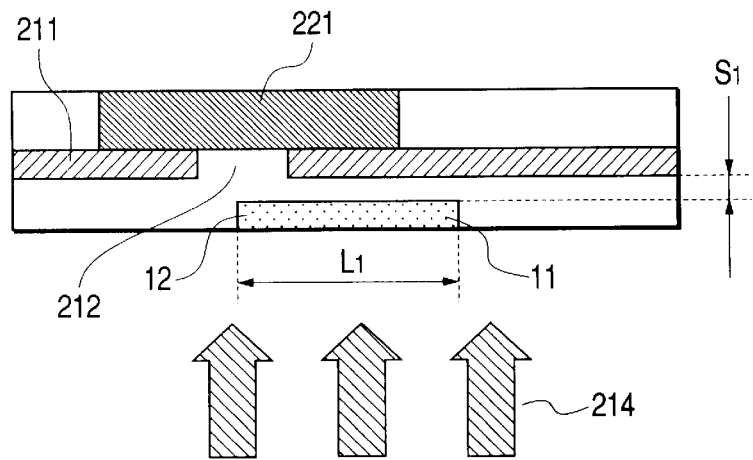
FIG. 25 illustrates a probe wherein a layer of an opaque film having an aperture is formed near of a scatterer-placed layer and a photodetector is formed in the vicinity thereof.

The opaque film is formed using, for example, a metal such as gold, silver, or aluminum, a semiconductor such as Si or GaAs, or a dielectric such as carbon. In this example, the aperture diameter $d_2$ was set at 70 nm. The distance $s_1$ is set at 0 or more and not longer than the wavelength of light. The smaller this value, the better, in order to decrease the quantity of background light. In this example, $s_1$ was set at 5 nm. As shown in FIG. 25, a detector 221 such as photodiode may be formed within a substrate. In this case, the detector 221 is formed on the opaque film 211 so that light passing through the aperture 212 can be detected directly by the detector. By so doing, alignment of the detector 221 with respect to the aperture 212 becomes unnecessary.

Fifth Exemplary Embodiment

The following description is provided about a probe fabricating method. Initially, as shown in FIG. 26(a), a scatterer 11 is formed on a sacrificial substrate 231 using electron beam lithography (scatterer fabricating step). Next, as shown in FIG. 26(b), a layer 232 of a light transmitting, or transparent, material (e.g., a dielectric such as $SiO_2$ or alumina) is thinly formed (transparent layer forming step), and then a resist layer is formed thereon as in FIG. 26(c) (resist layer forming step). Further, light is radiated in the direction of 234 as in FIG. 26(d), resulting in a powerful near field light being generated at a vertex 12, and the resist portion located near the vertex 12 is exposed to the near field light (exposure step).

If the resist is a negative type resist and if it is developed, there remains the resist at the vertex 12 as in FIG. 26(e) (development step). Then, an opaque film 211 is formed thereon by vacuum deposition, for example, followed by removal of the resist, leaving the opaque film 211 with an aperture formed in the vertex 12 (opaque film forming step). Next, as shown in FIG. 26(g), a light transmitting, or transparent, substrate 235 is affixed onto the opaque layer, or a thick layer of a light transmitting, or transparent, material (e.g., a dielectric such as $SiO_2$ or alumina) is formed on the opaque layer (transparent substrate forming step). Lastly, the sacrificial substrate 231 is removed (sacrificial substrate removing step), thereby affording a probe having an opaque layer with an aperture formed therein as in FIG. 26(h).

In the above manufacturing process, if the opaque film is not electrically conductive, the transparent layer forming step may be omitted, and the opaque film 211 may be formed directly onto the scatterer 11. If the resist layer itself possesses a light shielding property, the resist layer may be used as the opaque layer 211, and the exposed portion may be utilized as an aperture 212. In this case, however, there is used a positive type resist whose exposed portion is removed.

Sixth Exemplary Embodiment

Figure 27A:
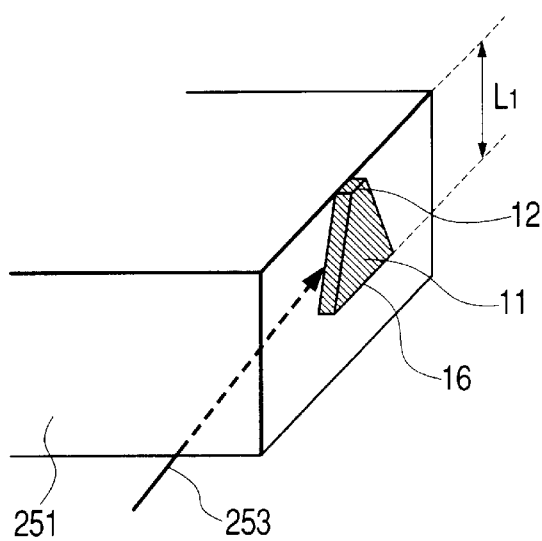
FIG. 27 comprises perspective views of probes in a state wherein the angle between a scatterer surface and a sample or medium surface is larger than 0° and not larger than 90°, in which 27(*a*) shows a state wherein a scatterer is disposed vertically, 27(*b*) shows a state wherein the scatterer is disposed obliquely, and 27(*c*) shows a state wherein the angle of a near field light generating vertex is 0°.
Figure 27B:
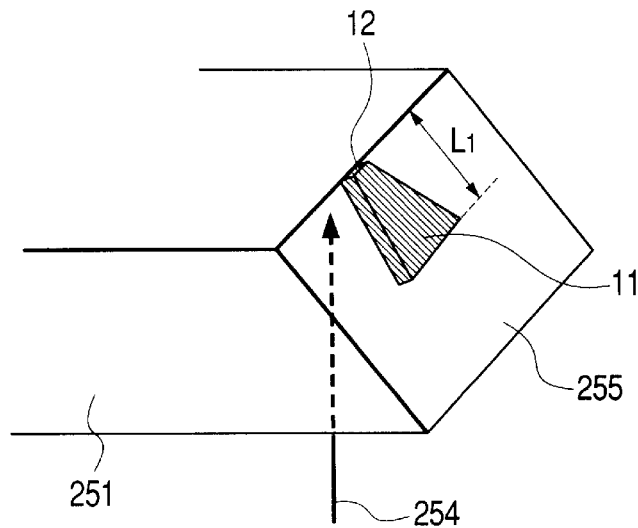

A description will now be given about the manner in which the scatterer is to be installed. As shown in FIG. 27(a) or 27(b), the scatterer may be disposed in such a manner that the surface thereof is at an angle of larger than 0° and not larger than 90° relative to a sample or medium surface. In this case, the scatterer is disposed such that its vertex 12 is the closest to the sample or the medium. As indicated at arrow 253, light may be introduced obliquely through the substrate or obliquely from the outside of the substrate. In the case where the scatterer is disposed obliquely, light can be introduced in a direction (arrow 254) perpendicular to the substrate. Thus, when the scatterer is disposed perpendicularly or obliquely with respect to the sample or the medium, the opposite-side edge 16 are spaced apart from the sample or medium surface. Therefore, a powerful near field light may be generated also at the edge 16, and the radius of curvature of the edge 16 may be small to the same extent as the vertex 12. That is, the angle Q of the vertex 12 may approach zero.

Figure 27C:
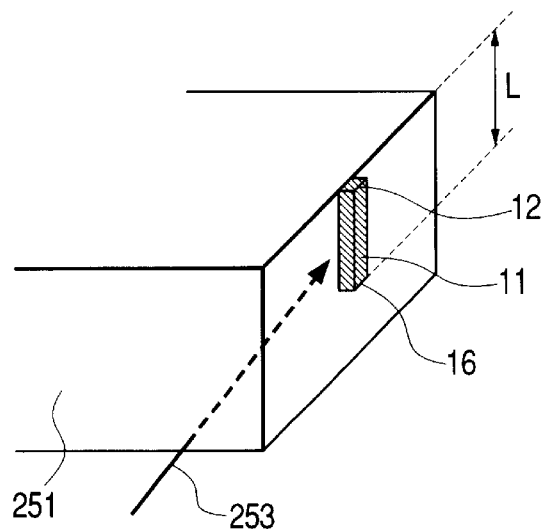

In an extreme case, the scatterer may be linear in shape (length $L_1$ is conformed to the resonance wavelength of plasmon), as shown in FIG. 27(c). The scatterer thus disposed perpendicularly or obliquely may be buried into the substrate, not on a side face of the substrate.

Figure 28A:
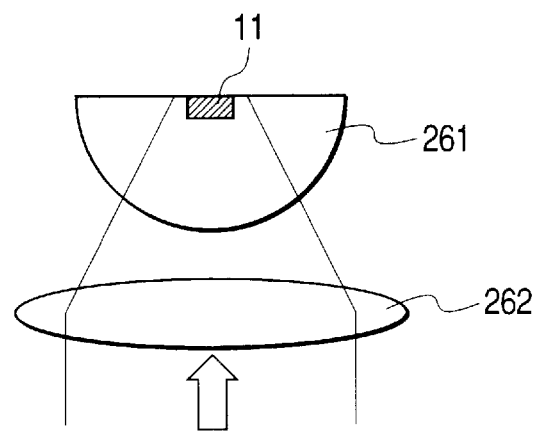
FIG. 28 illustrates a scatterer being formed on an end face of a light condensing element, a resonator, or a semiconductor laser, in which 28(*a*), 28(*b*), 28(*c*), and 28(*d*) show cases where scatterers are formed on end faces of a solid immersion lens, a Fresnel lens, a resonator, and a surface emitting laser, respectively.
Figure 28B:
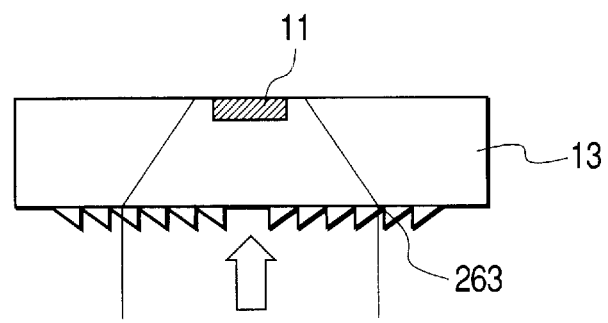
Figure 28C:
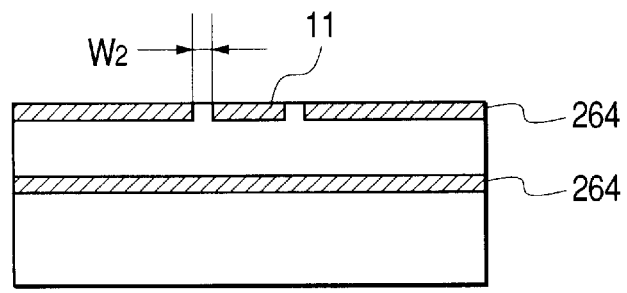

The scatterer may be formed on a light condensing element. For example, the scatterer may be formed on a substrate 13 having affixed thereto a solid immersion lens 261 such as that shown in FIG. 28(a) or a Fresnel lens 263 such as that shown in FIG. 28(b). In this case, the scatterer is formed on a light condensing point. By so doing, it becomes unnecessary to make a positional adjustment of the light condensing element and the scatterer. The scatterer may be formed near an exit surface of an optical resonator, more specifically within 10 $\mu$m from the exit surface. For example, as shown in FIG. 28(c), a reflective film for the resonance of light is formed on a substrate, an aperture is formed in the reflective film 264, and the scatterer 11 is disposed within the aperture. In this case, for suppressing the occurrence of background light, it is preferable that the spacing $w_2$ between the scatterer and the reflective film be set at a value of not larger than the wavelength of light. In this example, the value of $w_2$ is set at 50 nm. By thus forming the scatterer near the exit surface of the resonator, light which has been reflected without being incident on the scatterer is returned by the resonator and is again radiated to the scatterer, whereby the light utilization efficiency can be improved.

Figure 28D:
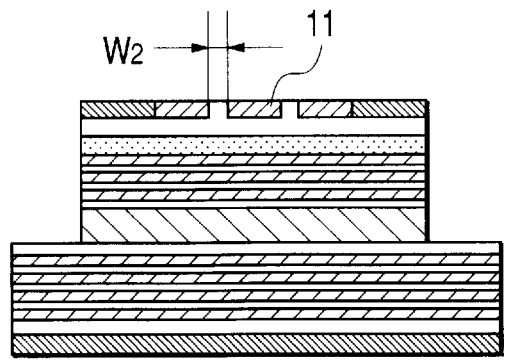

Further, the scatterer may be formed near an exit surface of a semiconductor laser, more specifically within 10 $\mu$m from the exit surface. For example, as shown in FIG. 28(d), the scatterer 11 is formed near an exit surface of a surface emitting laser. In this case, for suppressing the occurrence of background light, it is preferable to form a reflective film on the exit surface of the laser, form an aperture therein, and form a scatterer in the aperture. Preferably, the spacing $w_2$ between the scatterer and the reflective film be set not longer than the wavelength of light. In this example, the spacing $w_2$ was set at 50 nm. By thus forming the scatterer in the laser exit surface it becomes unnecessary to make a positional adjustment of the light source and the scatterer. Further, the scatterer may be formed near a light receiving surface of a photodetector such as a photodiode. More specifically, it is formed within 10 $\mu$m from the light receiving surface, whereby it becomes unnecessary to make a positional adjustment of the detector and the scatterer.

Figure 29A:
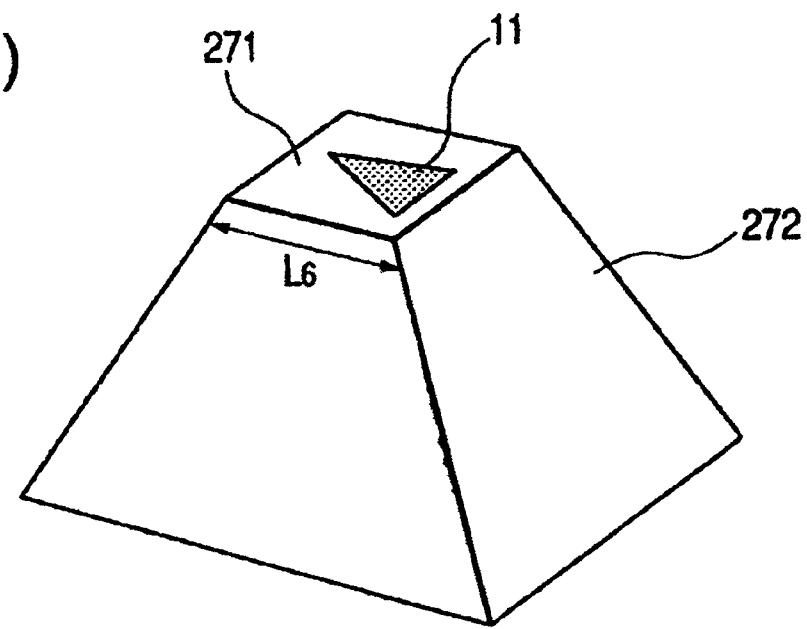
FIG. 29 illustrates probes each formed on a flat portion, the flat portion being formed at a projection tip of a pyramid, in which 29(*a*) shows a probe whose side faces are not covered with an opaque film and 29(*b*) shows a probe whose side faces are covered with an opaque film.
Figure 29B:
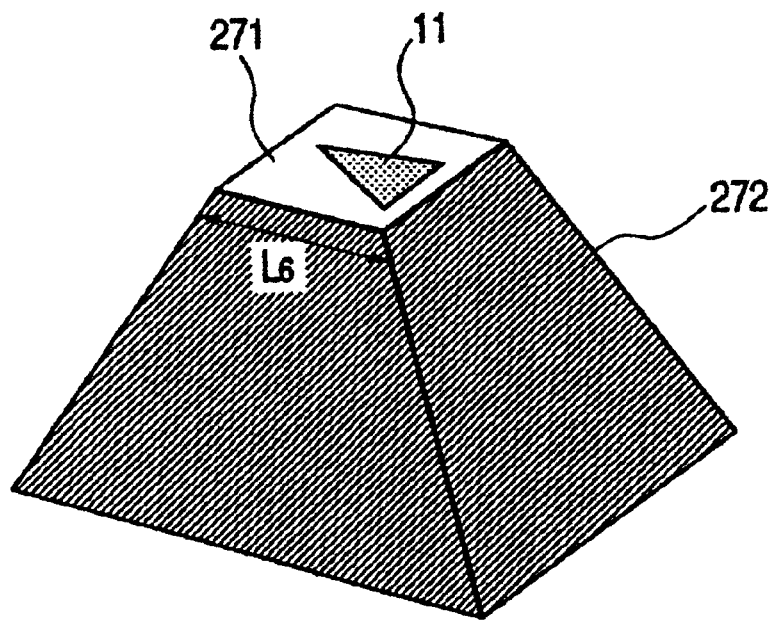

As shown in FIG. 29(a), the scatterer may be formed on a flat portion 271 at a projection tip of a cone or pyramid 272. In this case, it is preferable that the value of a minimum width $L_6$ of the flat portion be made as small as possible in order to permit easy access of the scatterer to a sample. As shown in FIG. 29(b), if the side faces of the pyramid are covered with metal, the projection of the pyramid acts as an optical waveguide, that is, acts to condense light to a certain portion of the scatterer 11.

In this case, if the minimum width $L_6$ of the flat tip portion is set not larger than the wavelength of light propagated through the projection (in terms of area, the area of the flat tip portion is not larger than the square of light propagated through the projection), it is possible to suppress background light generated from around the scatterer. However, if the width $L_6$ of the flat portion is set not larger than one half of the wavelength of light propagated through the projection, the quantity of light output from the tip decreases (because there exists no propagation mode of light if the waveguide diameter becomes one half or less of the wavelength of light). It is therefore preferable that the width $L_6$ of the flat portion be set at one half or more of the wavelength of light propagated through the projection (in terms of area, the area of the flat tip portion is not less than the square of one half of the light wavelength). In this example, the side faces of a quadrangular pyramid projection of $SiO_2$ are covered with 100 nm thick gold, and the tip width $L_6$ is set at 250 nm.

Figure 30A:
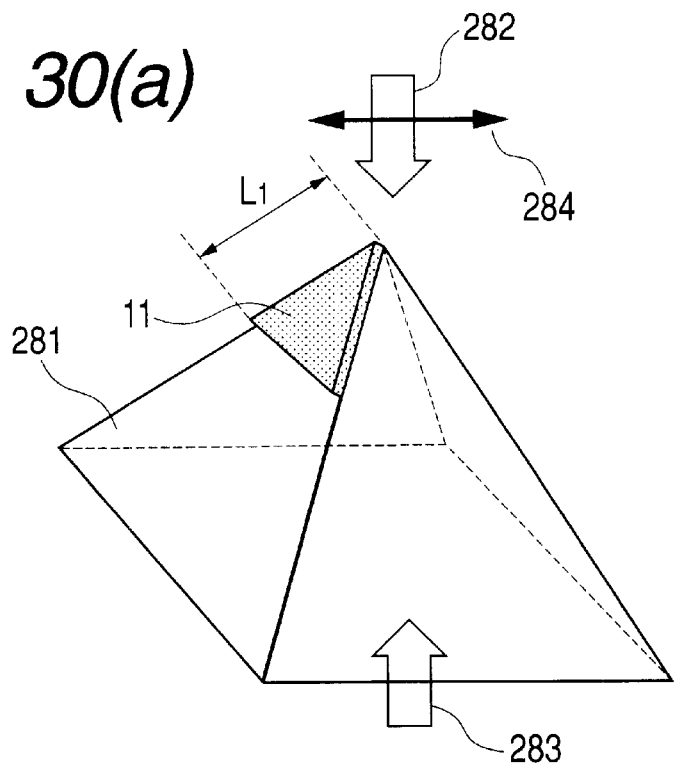
FIG. 30 illustrates probes with scatterers formed on side faces of a quadrangular pyramid, in which 30(*a*) shows a case where one scatterer is used and 30(*b*) shows a case where two scatterers are used.
Figure 30B:
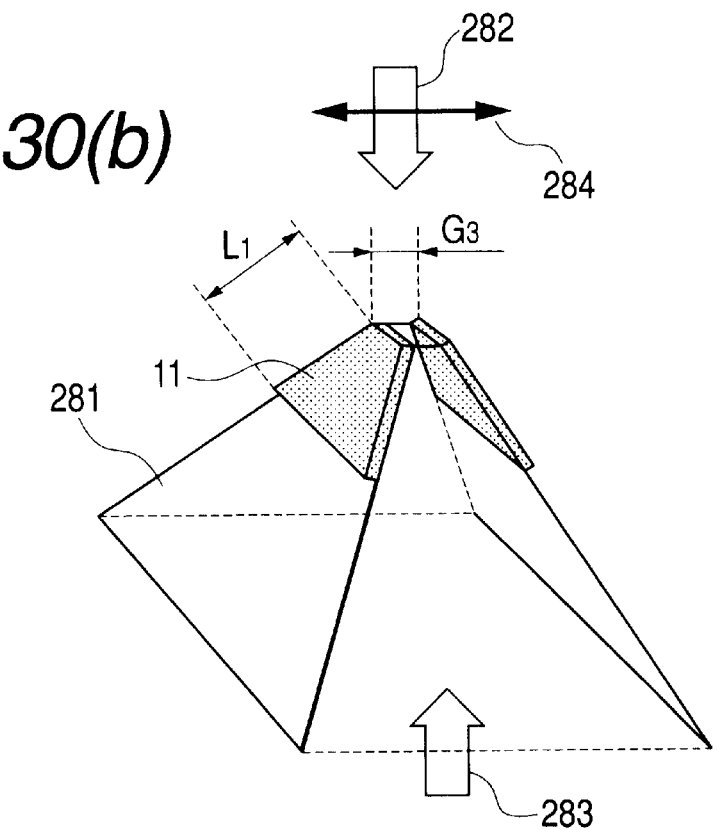

The scatterer may be formed on a side face of the pyramid projection. For example, as shown in FIG. 30(a), the scatterer is formed on the side faces of a quadrangular pyramid. Light is introduced from the inside (arrow 283) or outside (arrow 282) of the quadrangular pyramid and the direction of 284 is defined as a polarization direction. Length $L_1$ is conformed to the resonance wavelength of plasmon. As shown in FIG. 30(b), the scatterer may also be formed on each of two side faces of a substrate 281 which is in the shape of a quadrangular prism. In this case, between the scatterers formed on two side faces there is formed a gap of spacing $G_3$ which is not larger than the wavelength of incident light (10 nm in this example).

The projection of a cone or pyramid with the scatterer(s) formed at the foregoing tip or side face(s) may be formed at the tip of a cantilever in an atomic force microscope.

Seventh Exemplary Embodiment

Figure 31:
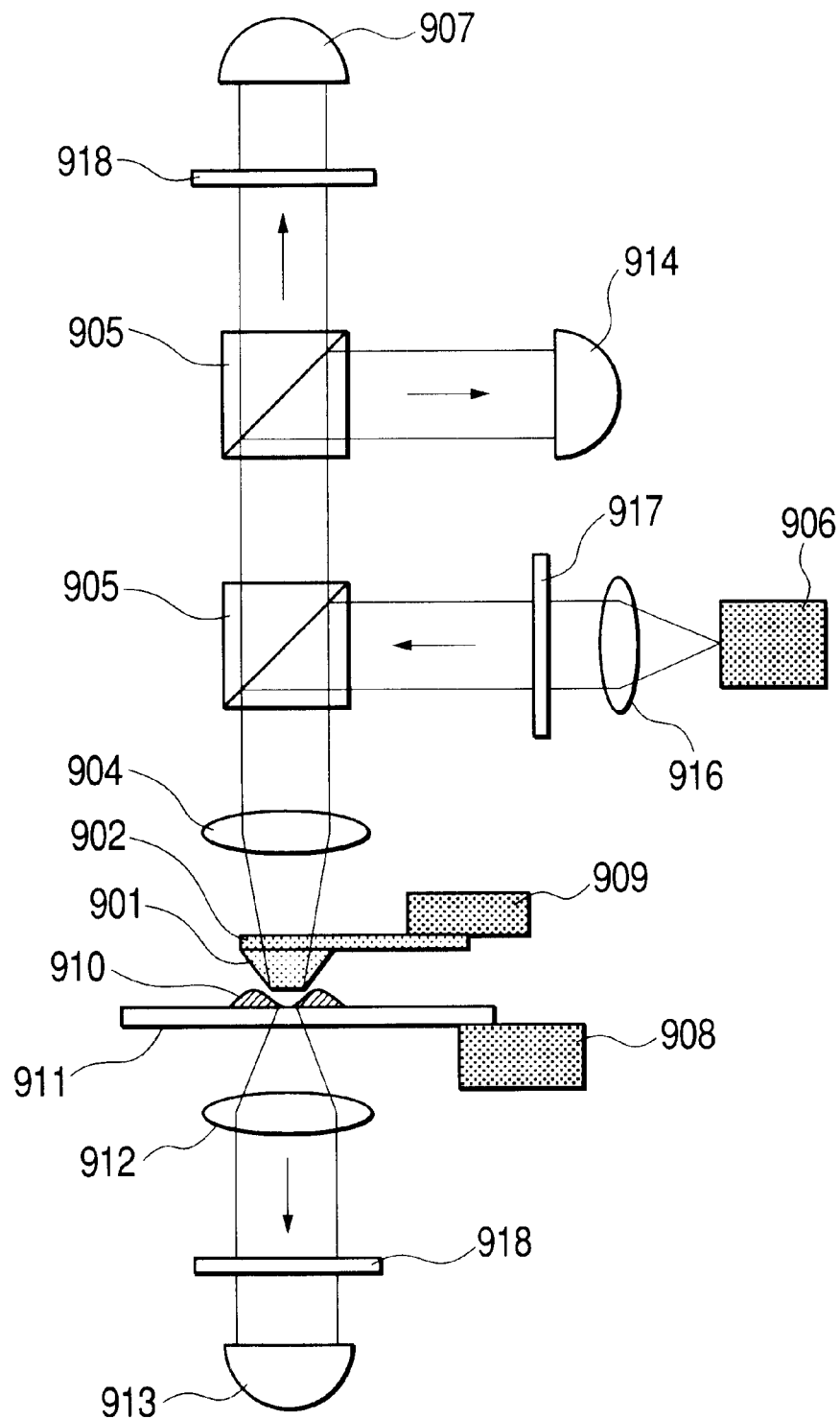
FIG. 31 illustrates an example of application of a probe according to the present invention to a near field optical microscope.

FIG. 31 shows an example in which the above near field optical probe is applied to a near field optical microscope. In this example, the probe is formed at the tip of a cantilever in an atomic force microscope. A sample 910 is placed on a substrate 911 and the near field optical probe 901 is approximated to the surface of the sample. Light emitted from a laser 906 is collimated by a lens 916, then passes through a beam splitter 905, and is incident on an objective lens 904. The light is condensed by the objective lens 904 and is converged through a metallic microstructure. Light generated in the probe is condensed by the objective lens 904 and is detected by a detector 907 or is condensed by an objective lens 912 disposed on the side opposite the sample and is detected by a detector 913.

When the sample is scanned in the horizontal direction with use of a piezoelectric element 908, a luminous intensity detected from the sample changes, and by recording this change it is possible to obtain an image of the sample. In the case where the polarization direction of a signal provided from the sample is different from that of incident light, if polarizers 917 and 918 are placed in an optical path (only the polarizers 918 will be necessary if the laser light is a linearly polarized light) such that the polarization direction of the polarizers 918 is orthogonal to the polarization direction of incident light, it is possible to improve the contrast.

It is necessary that the spacing between the probe tip and the sample surface be set at a value within several tens of nanometers, which is an "oozing depth" of near field light. The said spacing is controlled by measuring an atomic force acting between the probe tip and the sample surface. More specifically, using a piezoelectric element 909, the probe is oscillated in the vertical direction at an amplitude of several nanometers, and the spacing between the probe tip and the sample surface is controlled such that the amplitude becomes constant. Changes in amplitude are measured by applying light separate from the light emitted from the laser 906 to an upper surface 902 of the cantilever and by detecting light reflected therefrom with use of a PSD (Position Sensing Detector). This measurement may be accomplished by detecting with a PSD 914 a reflected portion from the upper surface 902 of the cantilever out of the light emitted from the laser 906.

Eighth Exemplary Embodiment

Figure 32A:
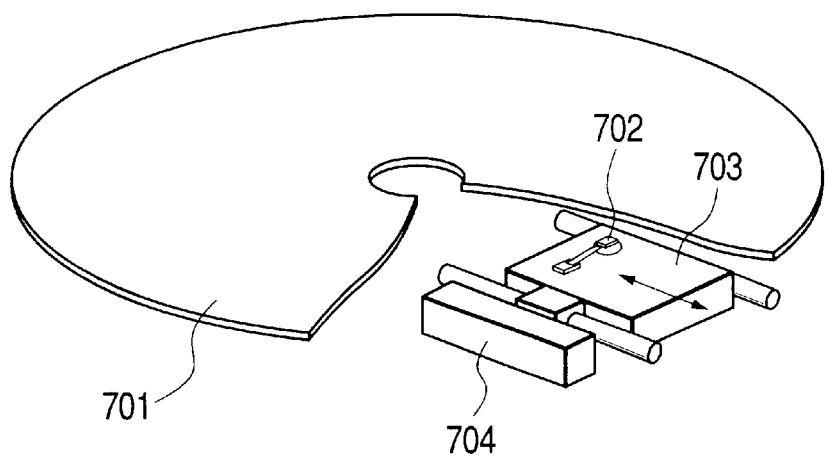
FIG. 32 illustrates an example of application of a probe according to the present invention to a near field optical recording/reproducing apparatus, in which 32(*a*) is an entire diagram and 32(*b*) shows an exemplary optical system.

FIG. 32 shows an example of application of the above near field optical probe to an optical recording/reproducing apparatus. The scatterer is formed on a slider 702, which is mounted on an optical head 703 carrying thereon an objective lens, a light source, and a detector.

Figure 32B:
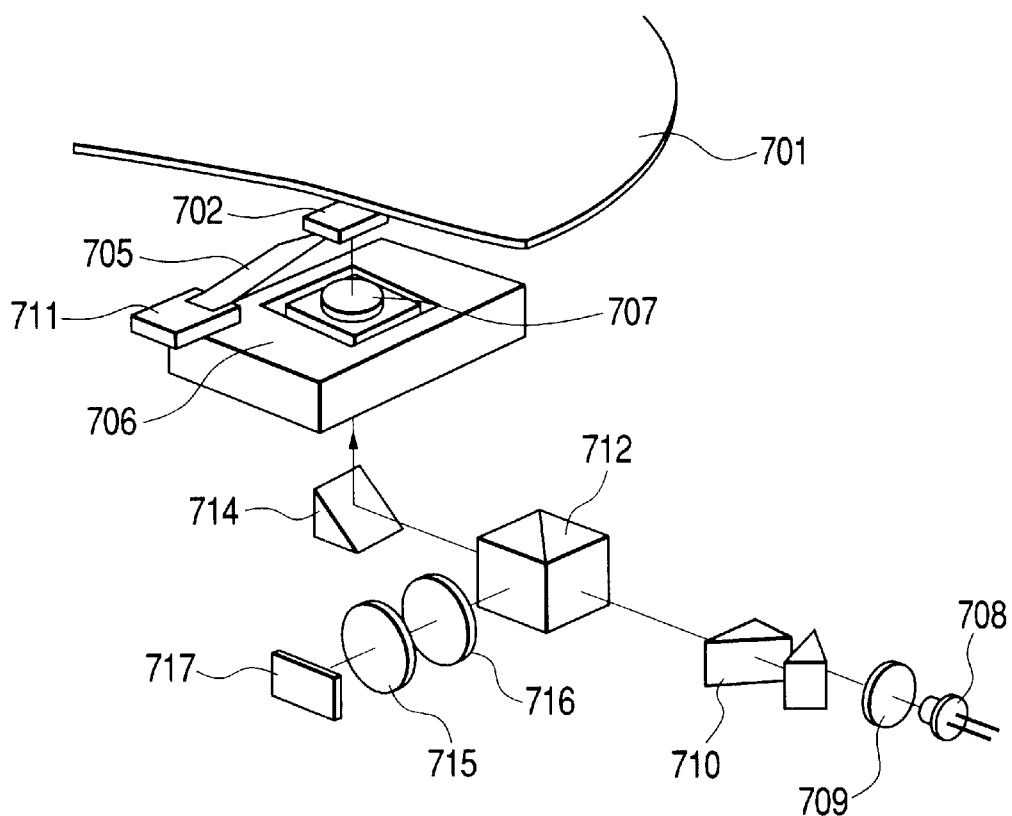

The slider is approximated to an optical disk 701. Using a carriage actuator 704, the optical head 703 is moved radially over the disk. An optical system disposed in the interior of the optical head is constructed as shown in FIG. 32(b). Using a semiconductor laser 708 as the light source (in this embodiment there was used a semiconductor laser of 780 nm wavelength and 30 mW output), emitted light is made into a circular parallel beam through a collimator lens 709 and a beam shaping prism 710. The beam passes through a beam splitter 712, a mirror 714, and an objective lens 707, and thereafter enters the near field probe 702. The position of the objective lens is adjusted by means of an actuator 706. A piezoelectric element 711 is used for finely adjusting the position of the near field probe in tracking. The probe 702 is attached to a suspension 705 and is pushed against the disk 701 with the force of the suspension 705.

In this embodiment, a phase change medium is used as the optical disk 701, and bit cells are formed by allowing a crystal phase to be changed into an amorphous phase by the near field light generated in the near field optical probe. Reproduction is performed by detecting a change in intensity of light which returns from the disk. More specifically, because the proportion of near field light scattered by the disk changes according to whether a bit cell is present or not, reproduction is conducted by detecting a change in intensity of the scattered light. Actually, light (signal light) from the disk is separated from the incident light by means of the beam splitter 712, is then passed through a condenser lens 715, and is thereafter detected by a detector 717. If the polarization direction of the signal light from the disk is different from that of incident light, then by placing a polarizer 716 in an optical path such that the polarization direction of the polarizer becomes orthogonal to the polarization direction of incident light, it is possible to improve the contrast.

Ninth Exemplary Embodiment

Figure 33A:
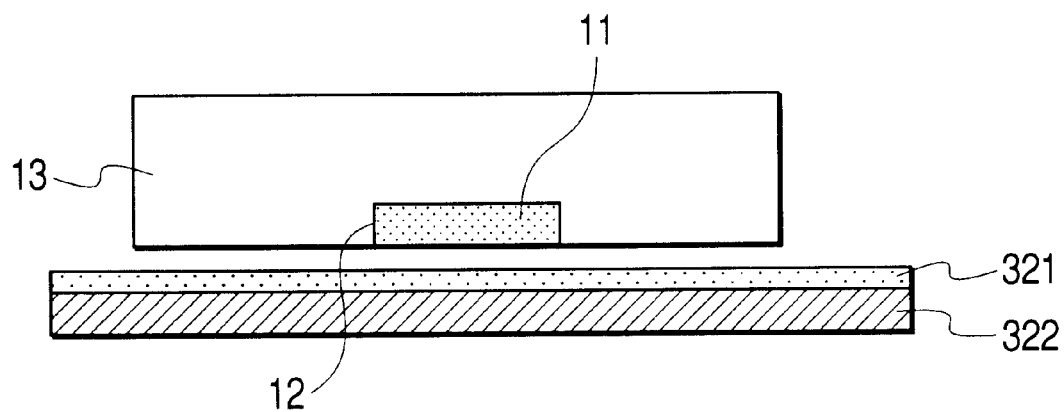
FIG. 33 illustrates an example of application of a probe according to the present invention to an exposure system.
Figure 33B:
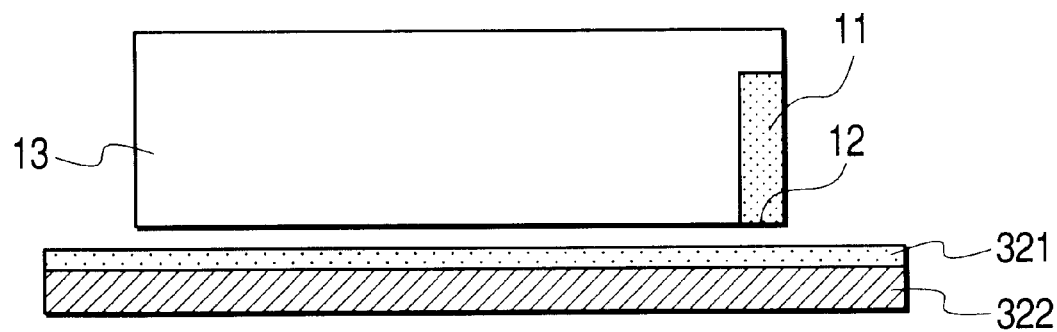
Figure 34A:
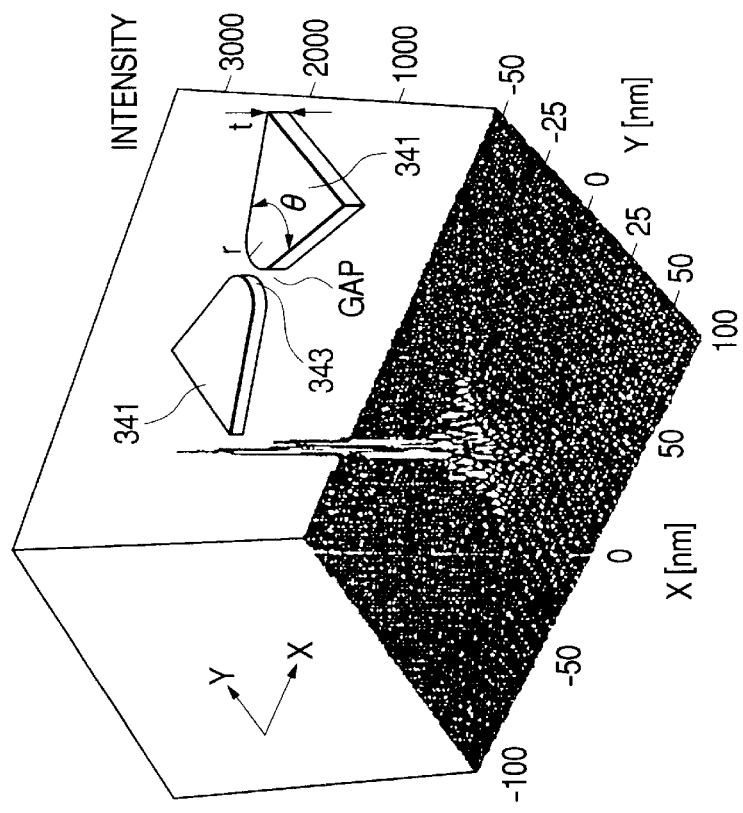
FIG. 34 illustrate conventional probes using planar, metallic scatterers.
Figure 34B:
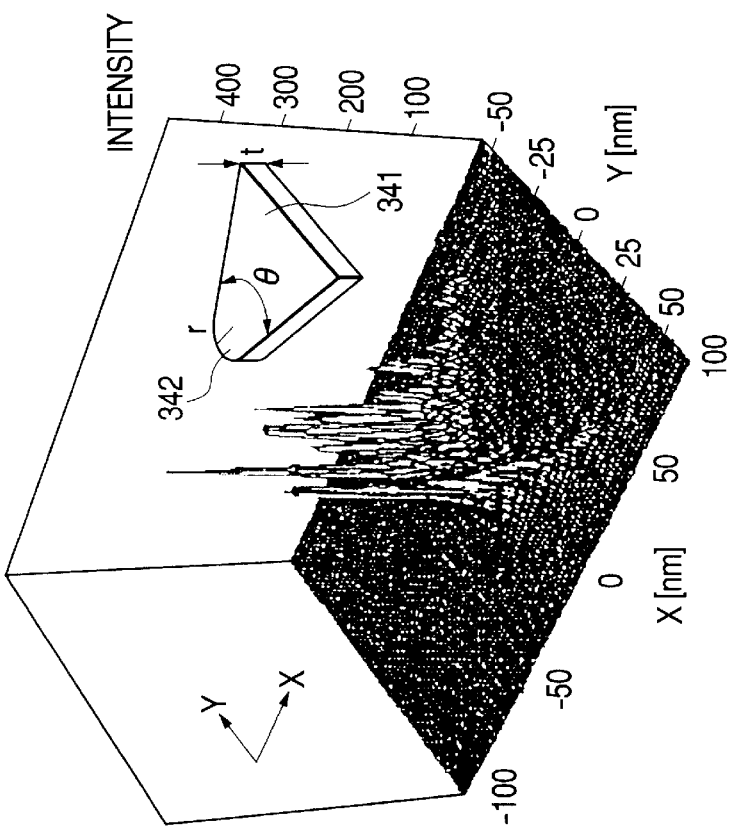

The above near field optical probe is also applicable to an exposure system for optical lithography. FIGS. 33(a) and 33(b) show application examples thereof. Photoresist 321 is applied onto a substrate 322 to be processed, and the probe having a tapered scatterer 11 is approximated thereto.

Upon incidence of light thereon for exposure of the photoresist, a localized powerful near field light is generated at a vertex 12, and the photoresist present at that portion is exposed to the light. After the exposure, the photoresist is developed, and the substrate 322 is subjected to a processing such as etching. It is preferable that the wavelength of incident light be set at a wavelength at which the resist is exposed to the light and at which there occurs plasmon resonance.

In this embodiment, aluminum was used as the material of the scatterer 11 and light having a wavelength of 442 nm was used as the incident light. With use of the probe according to the present invention, a fine scatterer not larger than the wavelength of light can be exposed to light of a very low power, and it is also possible to let the probe scan at high speed on the resist, thus permitting the reduction of the exposure time.

As set forth above, according to the optical near field generator of the present invention which uses a tapered plane scatterer, there are given optimum values of material, shape, and size of the scatterer, and on the basis of the optimum values there can be generated a near field light efficiently.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. An optical near field generator, comprising:
   a light source; and
   an electrically conductive scatterer which is tapered toward a vertex capable of generating a near field light, wherein the area of the scatterer is smaller than the area of a light spot radiated to the scatterer defined by the cross-section of the light source at the surface of the scatterer or wherein the area of the scatterer is smaller than the square of the wavelength of light radiated to the scatterer.

2. An optical near field generator according to claim 1, wherein the area of the light spot radiated to the scatterer is not larger than one hundred times the area of the scatterer.

3. An optical near field generator, comprising:
   a light source; and
   an electrically conductive scatterer which is tapered toward a vertex capable of generating a near field light, wherein the distance between the vertex of the scatterer and a point on the scatterer that is furthest from said vertex is smaller than the diameter of a light spot radiated to the scatterer defined by the cross-section of the light source at the surface of the scatterer or is smaller than the wavelength of light radiated to the scatterer.

4. An optical near field generator according to claim 3, wherein the diameter of the light spot radiated to the scatterer is not larger than ten times said distance.

5. An optical near field generator according to claim 1, wherein the scatterer has at least three vertices, wherein the vertices other than said near field light generating vertex have a radius of curvature larger than that of said near field light vertex.

6. An optical near field generator according to claim 5, wherein the shape of the scatterer is selected from the group consisting of a sectorial shape, a triangular shape, a combination of a triangle and circle shape, a pentagonal shape, and a shape in which the near field light generating vertex is the most acute of all of the angles of the scatterer.

7. An optical near field generator according to claim 1, further comprising:
   a sample or recording medium, wherein the surface of the scatterer is substantially parallel to an installation surface of the sample or a recording medium.

8. An optical near field generator according to claim 7, wherein the angle between the surface of the scatterer and the installation surface of the sample or a recording medium is larger than 0 degrees and not larger than 90 degrees, further wherein the distance from said vertex to the sample or recording medium is shorter than the distance from an area of the scatterer other than the vertex to the sample or the recording medium.

9. An optical near field generator according to claim 1, wherein the angle of said vertex is in the range of 30 to 80 degrees.

10. An optical near field generator according to claim 1, wherein a central position of the light spot is substantially coincident with a central position of the scatterer.

11. An optical near field generator according to claim 1, wherein a central position of the light spot is substantially coincident with the position of said vertex.

12. An optical near field generator according to claim 1, further comprising:
    a second electrically conductive scatterer which is tapered toward a vertex capable of generating a near field light, wherein the scatterers are disposed such that the spacing between the two near field light generating vertices is not larger than the wavelength of the incident light emitted from the light source.

13. An optical near field generator according to claim 12, wherein the scatterers are the same shape and further wherein the near field light generating vertices of the two scatterers are disposed in a 90° or 180° rotated position with respect to each other.

14. An optical near field generator according to claim 1, further comprising:
    at least two additional electrically conductive scatterers which are tapered toward a vertex capable of generating a near field light, wherein the near filed light vertices of each additional scatterer are disposed proximate to said near field light vertex of the first scatterer.

15. An optical near field generator according to claim 1, further comprising:
    a substrate, wherein the scatterer is formed in a buried state into the substrate in a manner such that the surface of the scatterer and a surface of the substrate are substantially flush with each other.

16. An optical near field generator according to claim 1, further comprising:
    a substrate, wherein the scatterer is formed on a surface of the substrate and a pad portion is also formed on the surface of the substrate in a manner such that the surface of the scatterer and that of the pad portion are substantially flush with each other.

17. An optical near field generator according to claim 1, wherein the thickness of the scatterer is at a minimum at said near filed light generating vertex.

18. An optical near field generator according to claim 1, further comprising:
    a light shielding film formed in the vicinity of the scatterer such that the spacing between the scatterer and the light shielding film is smaller than the wavelength of the light emitted from the light source.

19. An optical near field generator according to claim 1, further comprising:
    a cone or pyramid, wherein the scatterer is formed at a projection tip of the cone or a pyramid.

20. An apparatus including a near field generator, said apparatus comprising:
    an optical near field generator, comprising
    a light source, and
    an electrically conductive scatterer which is tapered toward a vertex capable of generating a near field light, wherein the area of the scatterer is smaller than the area of a light spot radiated to the scatterer defined by the cross-section of the light source at the surface of the scatterer or wherein the area of the scatterer is smaller than the square of the wavelength of light radiated to the scatterer, wherein the scatterer is formed at a location selected from the group consisting of a light condensing point on a light condensing element, in the vicinity of an optical resonator, in the vicinity of an exit surface of a semiconductor laser, and in the vicinity of a light receiving surface of a photodetector.

* * * * *